United States Patent
Daniels

(10) Patent No.: US 12,458,006 B2
(45) Date of Patent: Nov. 4, 2025

(54) FISH LURE COMPONENT

(71) Applicant: AI TACKLE INC., Ottawa (CA)

(72) Inventor: Bruce Ryan Daniels, Ottawa (CA)

(73) Assignee: AI TACKLE INC., Ottawa (CA)

( * ) Notice: Subject to any disclaimer, the term of this patent is extended or adjusted under 35 U.S.C. 154(b) by 0 days.

(21) Appl. No.: 18/281,109

(22) PCT Filed: Mar. 7, 2022

(86) PCT No.: PCT/CA2022/050327
§ 371 (c)(1),
(2) Date: Sep. 8, 2023

(87) PCT Pub. No.: WO2022/187944
PCT Pub. Date: Sep. 15, 2022

(65) Prior Publication Data
US 2024/0156074 A1 May 16, 2024

Related U.S. Application Data

(60) Provisional application No. 63/179,963, filed on Apr. 26, 2021, provisional application No. 63/159,756, filed on Mar. 11, 2021.

(51) Int. Cl.
*A01K 85/12* (2006.01)

(52) U.S. Cl.
CPC ................................. *A01K 85/122* (2022.02)

(58) Field of Classification Search
CPC .. A01K 85/122; A01K 85/125; A01K 85/128; A01K 85/143
See application file for complete search history.

(56) References Cited

U.S. PATENT DOCUMENTS

| | | | |
|---|---|---|---|
| 60,786 A * | 1/1867 | Rhodes | A01K 83/02 144/253.1 |
| 625,742 A | 5/1899 | Cartier | |
| 627,344 A * | 6/1899 | Maroney | A01K 85/02 43/42.46 |
| 1,803,777 A * | 5/1931 | Speich | A01K 85/02 43/42.46 |
| 2,419,295 A | 4/1947 | Slough | |
| 2,822,638 A * | 2/1958 | Warterfield, Jr. | A01K 85/02 43/42.46 |

(Continued)

OTHER PUBLICATIONS https://www.etsy.com/listing/1531345343/vintage-early-babcock-spring-loaded—(see p. 3 of 11—Vintage Early Babcock Spring Loaded Metal Double Hook Fishing Lure).

(Continued)

*Primary Examiner* — Richard G Davis
(74) *Attorney, Agent, or Firm* — Aventum IP Law LLP

(57) ABSTRACT

A fish lure component includes a hook portion having first and second hook members disposed in an opposing arrangement. A biasing member for normally biasing the hook portion in a closed configuration is disposed between the first and second hook members. A vane structure is provided to cause the fish lure component to rotate about an axis thereof during movement through a body of water and along a direction that is generally aligned with the axis. The hook portion is operable between the closed configuration and an open configuration in response to a fish strike on the hook portion.

26 Claims, 18 Drawing Sheets

(56) References Cited

U.S. PATENT DOCUMENTS

| | | | | |
|---|---|---|---|---|
| 2,982,046 A * | 5/1961 | Wilson | .................... | A01K 83/02 |
| | | | | 43/42.43 |
| 3,012,358 A * | 12/1961 | Multanen | ............... | A01K 85/12 |
| | | | | 43/42.31 |
| 3,159,940 A * | 12/1964 | Bokun | .................... | A01K 85/14 |
| | | | | 43/42.51 |
| 3,964,202 A * | 6/1976 | Ruppa | .................... | A01K 85/14 |
| | | | | 43/42.38 |
| 4,616,440 A * | 10/1986 | Millroy | .................. | A01K 85/12 |
| | | | | 43/42.12 |
| D764,013 S * | 8/2016 | Solberg | ........................ | D22/145 |
| 2003/0106256 A1 | 6/2003 | Sanner | | |
| 2014/0283433 A1 | 9/2014 | Gafford | | |
| 2014/0360087 A1 * | 12/2014 | Klose | ..................... | A01K 85/12 |
| | | | | 43/42.26 |
| 2016/0205910 A1 * | 7/2016 | Nelson | .................... | A01K 85/02 |
| 2020/0060248 A1 | 2/2020 | Choate | | |

OTHER PUBLICATIONS https://www.pinterest.ca/pin/202732420705217289/—(see p. 1 of 3—Vintage Tackle Contest: Old Glory Fish Hook & Animal Trap).

ISR/Written Opinion PCT/CA2022/50327—AI Tackle Inc.

\* cited by examiner

Retrieve Direction

Retrieve Direction

FISH LURE COMPONENT

CROSS-REFERENCE TO RELATED APPLICATIONS

This application claims the benefit of U.S. Provisional Application No. 63/159,756, filed on Mar. 11, 2021 and also claims the benefit of U.S. Provisional Application No. 63/179,963, filed on Apr. 26, 2021, the entire contents of both of which are incorporated herein by reference.

FIELD OF THE INVENTION

The present disclosure relates generally to fish lures, and more particularly to spinner-type fish lures.

BACKGROUND

Spinner-type fish lures used in recreational fishing are designed to resemble and move like an item of fish prey. The purpose of such lures is to use movement, vibration and color to catch the fish's attention and to entice the fish to bite the hook. Lures are usually used with a casting type of rod and reel, being continually cast out and retrieved, with the retrieval making the lure simulate swimming through the water. Alternatively, lures are used for trolling behind a boat that is moving at a slow rate of speed through a fishing area.

In calm water fishing, large desirable fish, such as bass, frequently hide just below lily pads, floating logs, and surface weeds. These large fish prefer to strike, to ambush prey, from protective cover under which they are safe from predators such as birds. The largest of these fish frequently like to attack and swallow surface floating prey that splash, disturb the water, or generate noise as the prey swims or struggles on the surface.

Of course, to be effective in such debris rich environments a fish lure needs to be "weedless" or designed in such a way that debris is deflected away from catching on the barbed point of any hooks. A popular type of "weedless" fish lure is the "safety pin" or overhead arm spinnerbait. Such lures include a wire frame that is bent roughly 90° with a lead body and a single hook at its base. Typically, a colorful skirt made from silicone or natural materials is attached to the lead body and may extend up to about ¼-inch or more past the bend of the hook. One or more reflective blades are normally attached to the overhead arm. These blades may be fabricated from metal or plastic, and often have a painted pattern or textured surface that is designed to flash in the sunlight to catch the fish's attention.

Despite their popularity, safety pin type lures do have a few disadvantages. Firstly, the fish may strike at the blades that are mounted to the overhead arm instead of the hook at the base of the lure. When this happens, the hook will not be set in the fish and the fish will get away. Secondly, although the overhead arm protects the hook from being snagged on submerged obstacles, such as logs, branches and rocks, it is not completely effective at preventing snagging on weeds, especially in heavily weeded environments. Fish are less likely to strike a lure that is trailing a mass of weeds.

It would be beneficial to provide a lure design that overcome at least some of the above-mentioned disadvantages and/or limitations.

SUMMARY OF THE INVENTION

In accordance with an aspect of at least one embodiment, there is provided a fish lure component, comprising: a hook portion having first and second hook members disposed in an opposing arrangement; a biasing member for normally biasing the hook portion in a closed configuration; and a vane structure configured to rotate about an axis thereof during movement of the vane structure through a body of water and along a direction that is generally aligned with the axis; wherein the vane structure communicates with the hook portion such that rotational motion of the vane structure is at least partially transferred to the hook portion, and wherein the hook portion is operable between the closed configuration and an open configuration in response to a fish strike on the hook portion.

In accordance with an aspect of at least one embodiment, there is provided a fish lure component, comprising: a hook portion comprising first and second hook members arranged one adjacent to the other and such that the bend direction of the first hook member is oriented opposite the direction of the second hook member, the first and second hook members being further arranged to pivot about a common pivot pin; a rotation-inducing surface configured cause the hook portion to rotate when the fish lure component is drawn through a body of water; and an attachment structure.

In accordance with an aspect of at least one embodiment, there is provided a fish lure, comprising: a frame having a first arm portion and a second arm portion forming a generally V-shape, the first arm portion extending to a first end of the frame and the second arm portion extending to a second end of the frame; and a first assembly coupled to the first end of the frame; wherein the first assembly comprises the following elements: a hook portion having first and second hook members disposed in an opposing arrangement; a biasing member for normally biasing the hook portion in a closed configuration; and a vane structure configured to rotate about an axis thereof during movement of the vane structure through a body of water and along a direction that is generally aligned with the axis wherein the vane structure communicates with the hook portion such that rotational motion of the vane structure is at least partially transferred to the hook portion, and wherein the hook portion is operable between the closed configuration and an open configuration in response to a fish strike on the hook portion.

In accordance with an aspect of at least one embodiment, there is provided a fish lure component, comprising: a hook portion; and a vane structure configured to rotate about an axis thereof during movement of the vane structure through a body of water and along a direction that is generally aligned with the axis; wherein the vane structure communicates with the hook portion such that rotational motion of the vane structure is at least partially transferred to the hook portion.

In accordance with an aspect of at least one embodiment, there is provided a fish lure, comprising: a frame having a first arm portion and a second arm portion forming a generally V-shape, the first arm portion extending to a first end of the frame and the second arm portion extending to a second end of the frame; and a first assembly coupled to the first end of the frame; wherein the first assembly comprises the following elements: a hook portion; and a vane structure configured to rotate about an axis thereof during movement of the vane structure through a body of water and along a direction that is generally aligned with the axis wherein the vane structure communicates with the hook portion such that rotational motion of the vane structure is at least partially transferred to the hook portion.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF EMBODIMENTS OF THE INVENTION

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein.

Figure 1A:
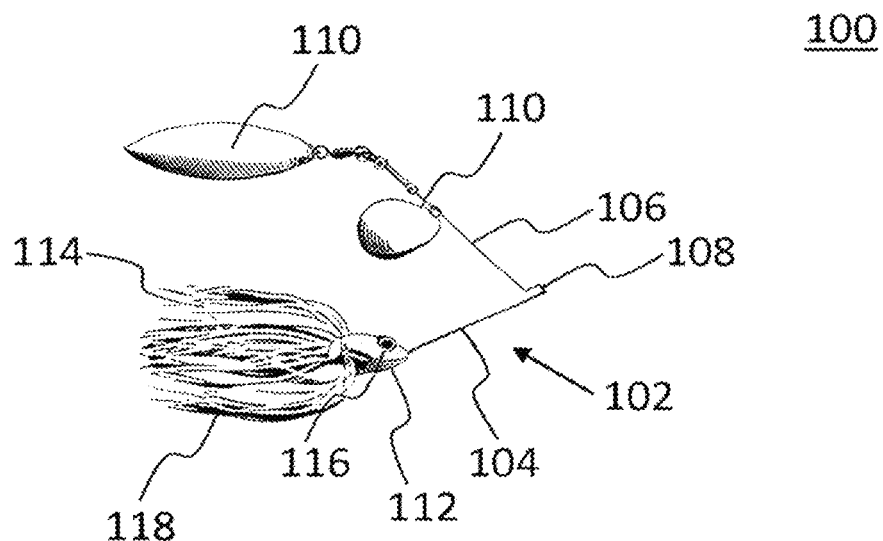
FIG. 1A is a simplified representation of a prior art "safety pin" or overhead arm spinnerbait.

Referring to FIG. 1A, shown is a simplified representation of a prior art "safety pin" or overhead arm spinnerbait 100. The spinnerbait 100 includes a frame 102, which is a single piece of wire bent roughly 90° to define a base arm 104 and an overhead arm 106. The frame 102 is further shaped to define an attachment structure 108, for securing the spinnerbait 100 to a fishing line or snap lure connector, etc. One or more blades 110 may be mounted to the overhead arm 106. In the example shown in FIG. 1A, blades 110 are mounted at the end of the overhead arm 106 as well as near the mid-point of the overhead arm 106. The blades 110 may be fabricated from a suitable metal, alloy, plastic and/or composite material, and are typically highly reflective so as to create a "flash" of reflected sunlight. Optionally, the blades 110 are patterned to simulate part of a prey species. A lead body 112 and a single hook 114 are typically provided at the end of the base arm 104, with the bend of the hook being directed toward the overhead arm 106 such that the overhead arm 106 acts as a shield to prevent snagging of the hook 114 on submerged objects. Various types of mimicry may be incorporated into the spinnerbait 100 so as to better imitate the appearance of a prey fish. For instance, the lead body 112 may be decorated with an eye-shaped pattern 116, and a skirt 118 made from silicone or natural materials may be attached to the lead body 112 to hide the hook 114.

Figure 1B:
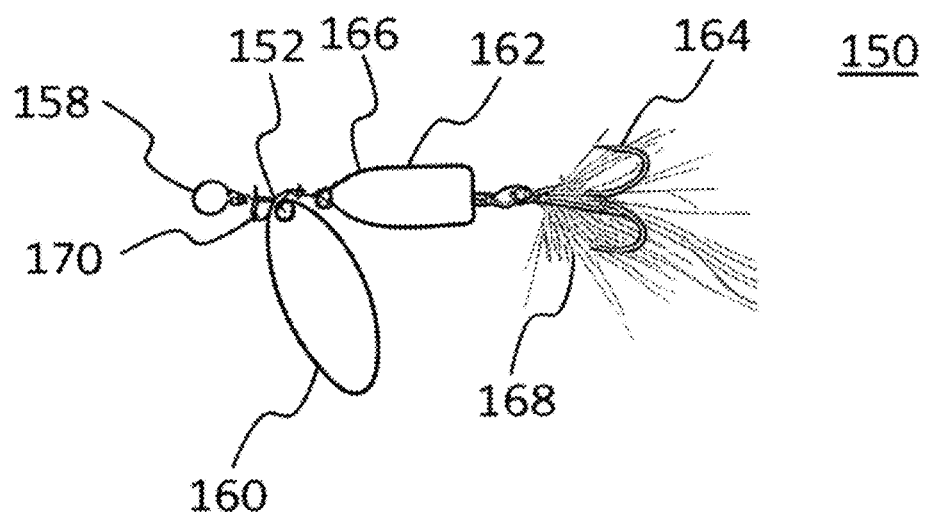
FIG. 1B is a simplified representation of a prior art "in-line" spinnerbait.

Referring now to FIG. 1B, shown is a simplified representation of a prior art "in-line" spinnerbait 150. The in-line spinnerbait 150 includes a frame 152 in the form of a single wire, with an attachment structure 158 secured at a first end thereof and a lead body 162 formed at a second end opposite the first end. The lead body 162 may be decorated with an eye-shaped pattern 166, and a skirt 168 may be provided to hide the hook 164, which in the example shown in FIG. 1B is a treble hook. One or more blades 160 may be mounted to the frame 152 using e.g., a clevis 170.

Figure 2:
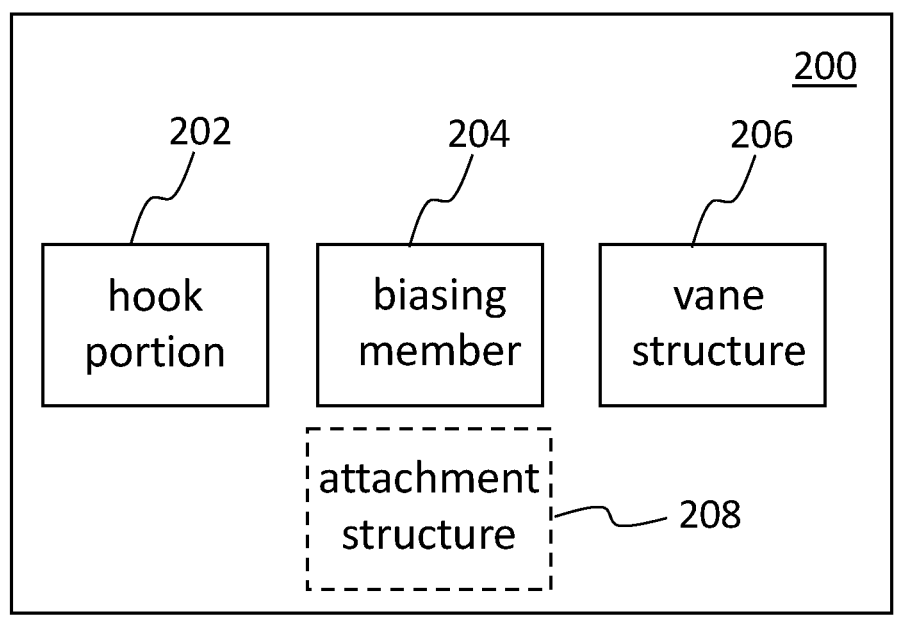
FIG. 2 is a simplified block diagram showing the elements of a fish lure component according to an embodiment.

Referring now to FIG. 2, shown is a simplified block diagram showing the elements of a fish lure component 200 according to an embodiment. Specifically, the fish lure component 200 includes a hook portion 202, a biasing member 204 for normally biasing the hook portion in a closed configuration, and a vane structure 206 for causing the hook portion 202 to rotate about a longitudinal axis thereof as the fish lure component 200 is drawn through a body of water, such as for instance during retrieval after being cast out or during trolling. Depending on the implementation, the fish lure component 200 also includes an optional attachment structure 208. The various elements shown in FIG. 2 are considered in greater detail in the following sections.

Figure 3A:
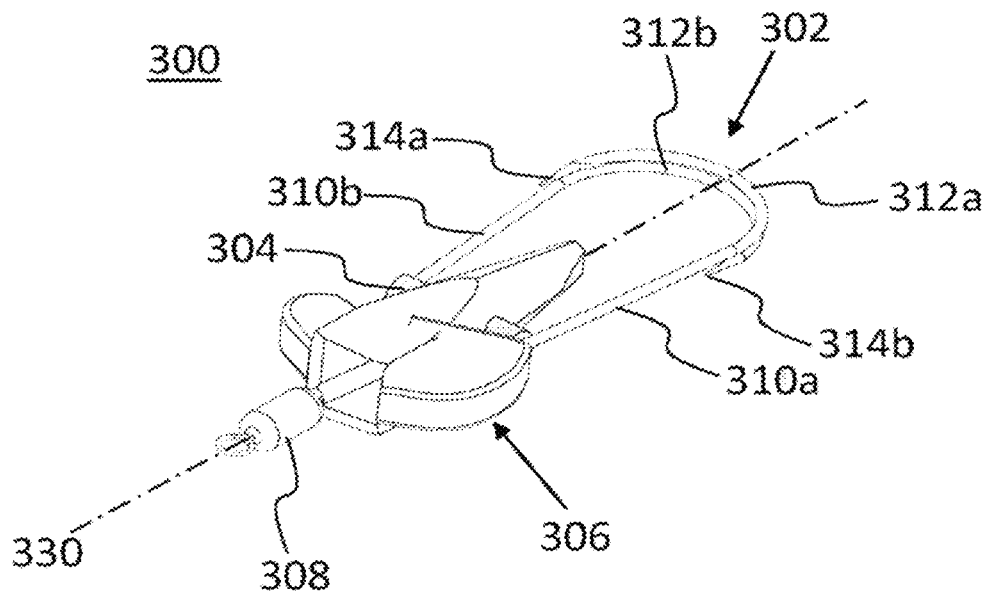
FIG. 3A is a simplified perspective view of a fish lure component according to an embodiment, in a closed configuration.

Referring now to FIG. 3A, shown is a simplified perspective view of a fish lure component 300 according to an embodiment, in a closed configuration. The fish lure component 300 includes a hook portion shown generally at 302. The hook portion 302 includes a first hook member having a first shank 310a, a first bend 312a and a first point 314a. The hook portion 302 further includes a second hook member having a second shank 310b, a second bend 312b and a second point 314b.

Figure 3B:
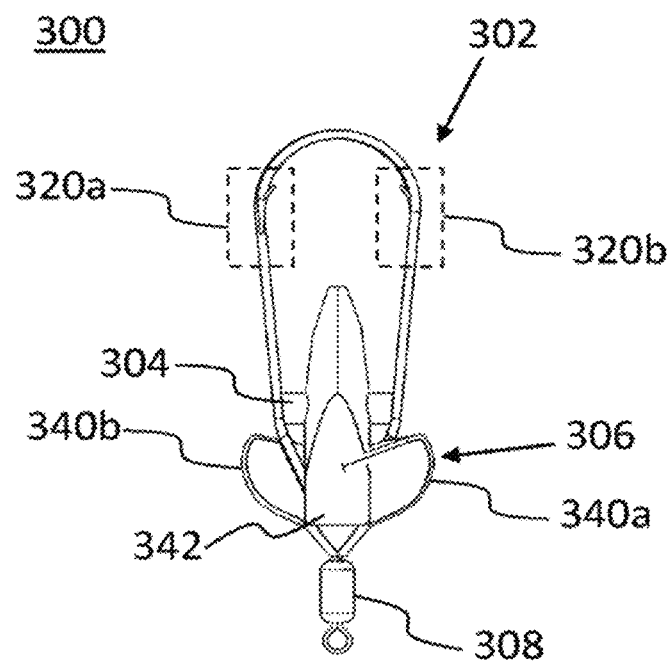
FIG. 3B is a simplified top view of the fish lure component of FIG. 3A, in the closed configuration.

Now referring also to FIG. 3B, the first hook member and the second hook member are disposed in an opposing arrangement, such that the direction of the first bend 312a is opposite the direction of the second bend 312b. Further, the first hook member and the second hook member are disposed in an overlapping and generally parallel arrangement. In particular, within the region that is indicated by the dashed-line box 320a in FIG. 3B, the first point 314a of the first hook member is in an overlapping and generally parallel arrangement with the second shank 310b of the second hook member. Similarly, within the region that is indicated by the dashed-line box 320b in FIG. 3B, the second point 314b of the second hook member is in an overlapping and generally parallel arrangement with the first shank 310a of the first hook member.

A biasing member 304 normally biases the hook portion 302 in the closed configuration that is shown in FIG. 3A and FIG. 3B. In the closed configuration, the shank of one of the hook members protects the hook of the other one of the hook members. In this way, for example, the first point 314a is aligned with and adjacent to the second shank 310b such that the first point 314a is not exposed to the surfaces of submerged obstacles and therefore cannot become snagged on such obstacles. During use, the hook portion 302 is biased into the closed configuration during casting and retrieval. The biasing member 304 supplies a biasing force that is sufficient to maintain the hook portion 302 in the closed configuration even during the rotation of the hook portion 302 that is induced by the vane structure 306 and during contact with submerged obstacles. The closed configuration is a "weedless" and "snagless" configuration, since the first and second points 314a and 314b are prevented from becoming entangled in weeds, in addition to being protected from snagging on submerged articles.

A vane structure 306 is provided for causing the hook portion 302 to rotate about the longitudinal axis indicated by the dash-dot line 330 in FIG. 3A. In this embodiment, the vane structure 306 is formed by a pair of wing-shaped or blade-shaped extensions 340a and 340b of a housing 342, as illustrated most clearly in FIG. 3B. The size, shape, vane angle etc., of the extensions 340a and 340b are selected to cause stable rotation of the housing 342, and therefore also the hook portion 302, under typical retrieval rates and for specific characteristic of the fish lure component 300 itself. Since the hook portion 302 is mounted in the housing 342, and rotation between the two is not possible in this embodiment, the hook portion 302 will rotate at the same rate as the housing 342 itself. In order to facilitate rotation of the housing 342 and hook portion 302, the attachment structure 308 is preferably a swivel, such as for instance a barrel swivel.

Figure 3C:
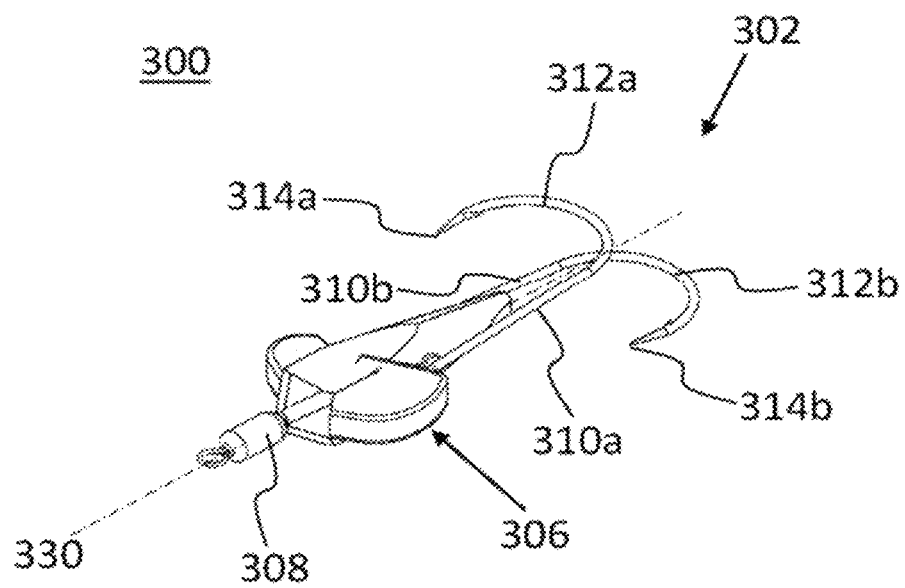
FIG. 3C is a simplified perspective view of the fish lure component of FIG. 3A, in an opened configuration.
Figure 3D:
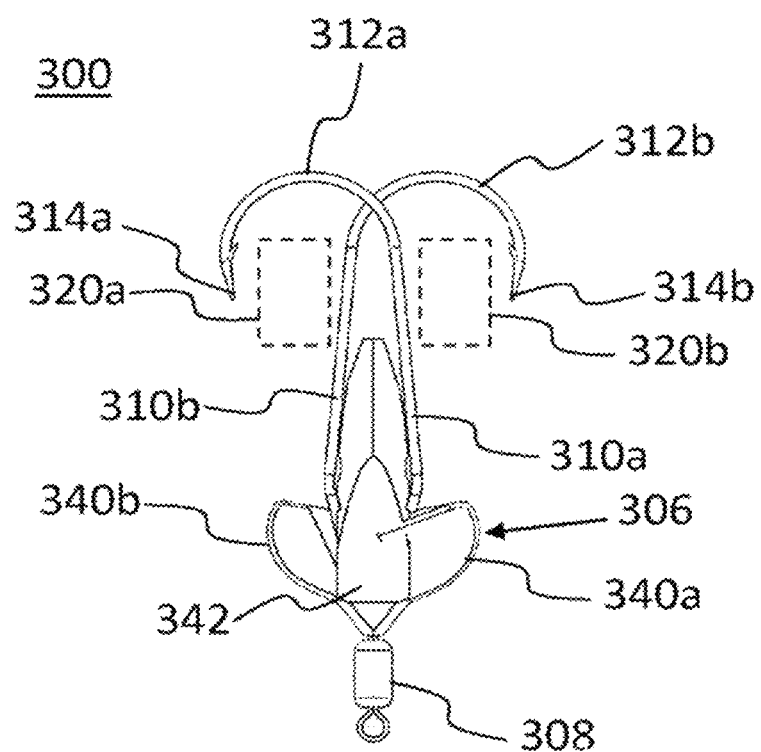
FIG. 3D is a simplified top view of the fish lure component of FIG. 3A, in the opened configuration.

Referring now to FIGS. 3C and 3D, the fish lure component 300 is shown in an opened configuration. The fish lure component 300 may be in the opened configuration as a result of a fish strike, which acts against the force exerted by the biasing member 304 to pivot the shanks 310a and 310b of the first and second hook members, respectively, toward one another. The first and second points 314a and 314b are both displaced outwardly away from the longitudinal axis 330, such that they are no longer protected by the shanks 310b and 310a, respectively, and are thereby "opened" and exposed for being set into the fish. Advantageously, two separate hook points 314a and 314b are available for being set into the fish. The biasing member 304 stores potential energy when the hook portion 302 is in the open configuration, which is used to return the hook portion to the closed position when the fish is removed from the hook portion. The dashed-line boxes 320a and 320b are shown in FIG. 3D to indicate the protected locations occupied by the first and second points 314a and 314b when the hook portion is in the closed configuration, and to emphasize the extent to which the hook portion 302 may be opened in response to a fish strike.

Figure 3E:
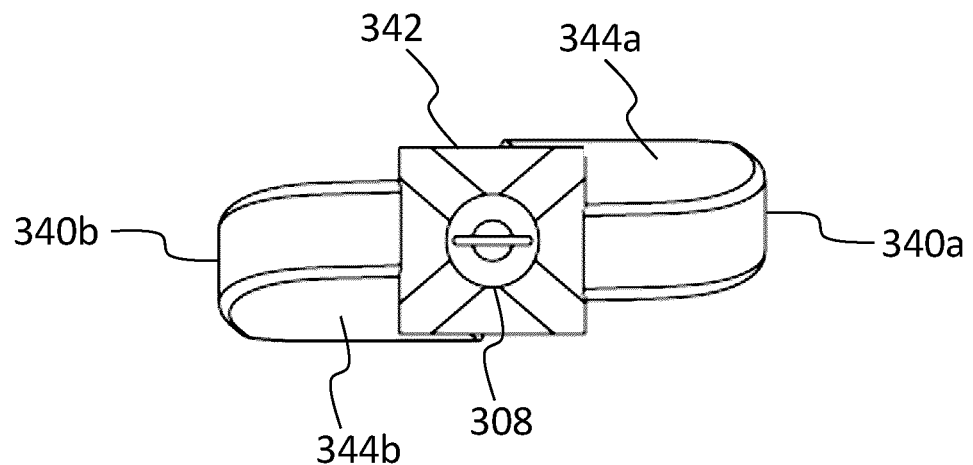
FIG. 3E is a simplified view of the attachment end of the fish lure component of FIG. 3A.
Figure 3F:
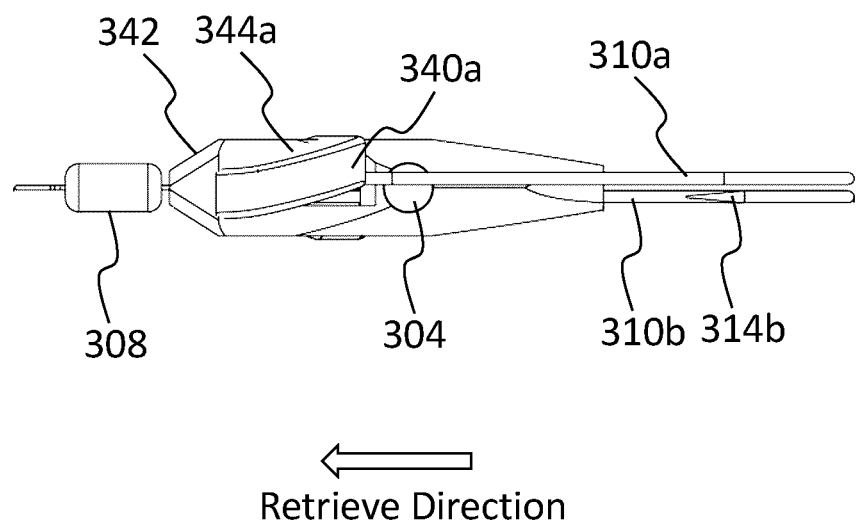
FIG. 3F is a simplified side view of the fish lure component of FIG. 3A.

As shown in FIGS. 3E and 3F, the extensions 340a and 340b of the housing 342 include respective surfaces 344a and 344b, i.e., leaning surfaces, which are shaped to cause rotation of the housing 342 when the fish lure component 300 moves relative to the water in the retrieve direction indicated by the block arrow in FIG. 3F. Of course, the extensions 340a and 340b of the housing 342 also include respective trailing surfaces (not illustrated), which are also shaped to cause rotation of the housing 342 when the fish lure component 300 moves relative to the water in the retrieve direction indicated by the block arrow in FIG. 3F.

Referring now to FIGS. 4A-4G, shown is a stepwise assembly of the elements of the fish lure component 300. FIGS. 4A-4G do not imply the steps of an actual method for fabricating the fish lure component 300, but rather they are intended to show more clearly each of the elements of the fish lure component 300. As will be apparent, a manufacturing method may involve assembly of the various elements in a different order and/or may combine two or more of the individual elements shown in FIGS. 4A-4G into a subassembly to be assembled together with the remaining elements. As will also be apparent, various substitutions may be made by one of ordinary skill in the art. Alternatively, the fish lure component 300 may be fabricated by a different process, using appropriate combinations of suitable materials including any of plastic materials, metal materials, metal alloy materials, composite materials etc. In addition, some or all of the elements of the fish lure component 300 may be fabricated using stamping, injection molding, machining and/or additive manufacturing processes.

Figure 4A:
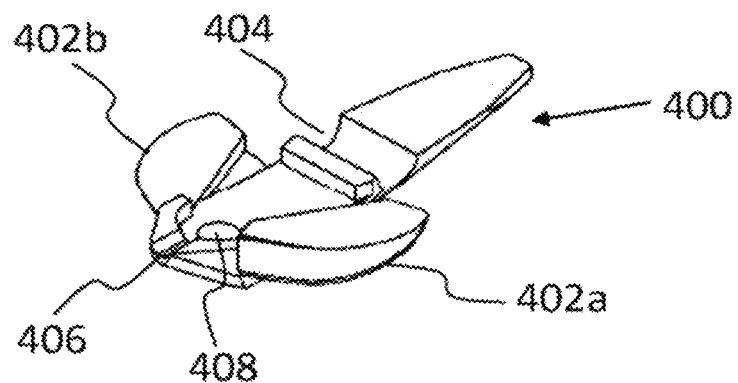
FIGS. 4A-4G show stepwise assembly of the elements of the fish lure component of FIG. 3A.

FIG. 4A shows a first housing part 400, which is fabricated e.g., by injection molding a suitable thermosetting or thermoplastic material. The first housing part 400 is formed with portions 402a and 402b, which define first parts of the extensions 340a and 340b, respectively, of the full housing 342. Channels 404 and 406 are defined in different areas of the first housing part 400, for accommodating the biasing member 304 and attachment structure 308, respectively. A recess 408 is also formed along in the surface of the first housing part 400 that is visible in FIG. 4E.

Figure 4B:
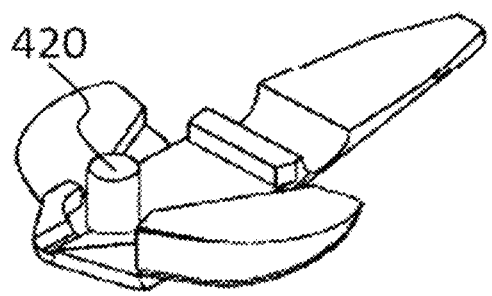

FIG. 4B shows a pivot pin 420, also referred to as the common pivot pin, inserted into the recess 408. The recess 408 securely retains the inserted end of the pivot pin 420. The pivot pin 420 may be fabricated from a suitable metal or metal alloy material, such as for instance stainless steel, or from a suitable plastic, composite or a ceramic material, or another suitable material that is sufficiently hard and corrosion resistant.

Figure 4C:
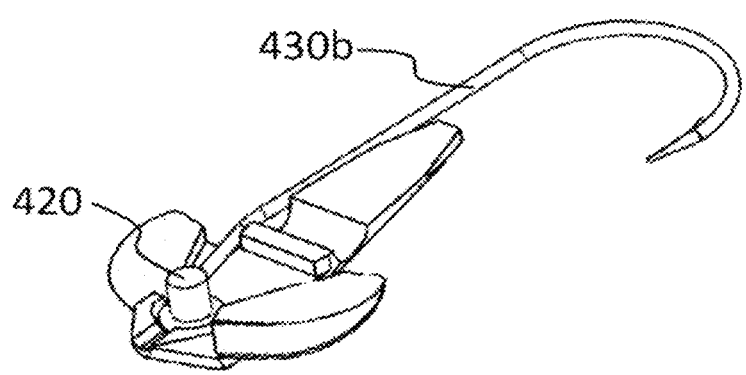
Figure 4D:
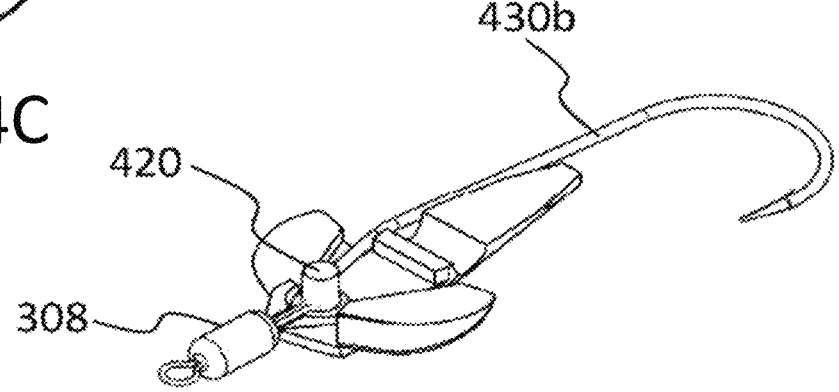
Figure 4E:
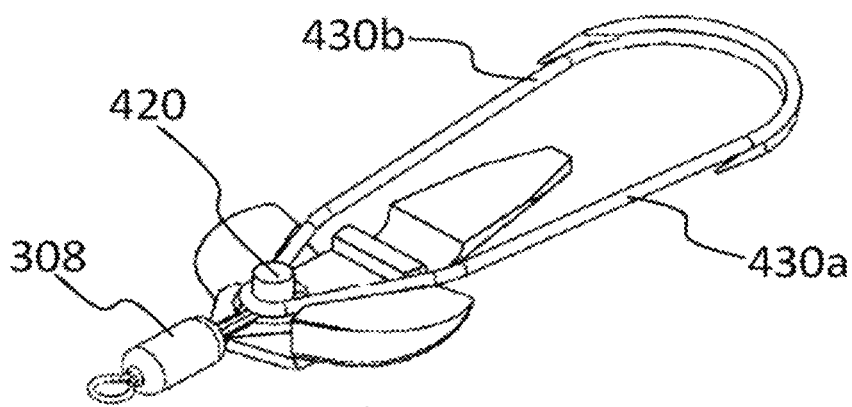

As shown in FIGS. 4C-4E, the second hook member 430b, the attachment structure 308 and the first hook member 430a are all mounted onto the pivot pin 420. For instance, the first and second hook members 430a and 430b each have a ring-shaped structure formed at an end thereof that is opposite the respective point 314a or 314b. The attachment structure 308 similarly has a ring-shaped portion. The pivot pin secures each of the first and second hook members 430a and 430b, and the attachment structure 308, whilst supporting independent pivoting movement of said elements about the common pivot pin. The attachment structure 308, e.g., a barrel swivel, accommodates rotation of the fish lure component 300 induced by the vane structure 306.

Figure 4F:
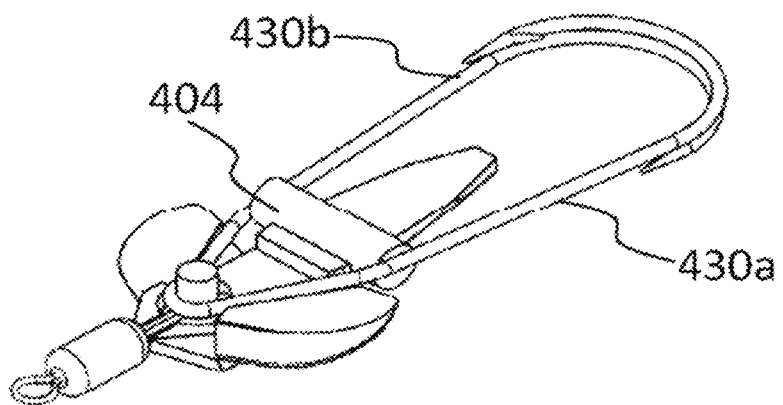

FIG. 4F shows the biasing member 304 disposed within the channel 404 of the first housing part 400, and between the shank portions (i.e., 310a and 310b) of the first and second hook members 430a and 430b. An example of a suitable biasing member 304 is a compression spring. Alternatively, a resiliently compressible material may be used to form the biasing member 304 (i.e., as discussed below in greater detail with reference to FIGS. 13A-E).

Figure 4G:
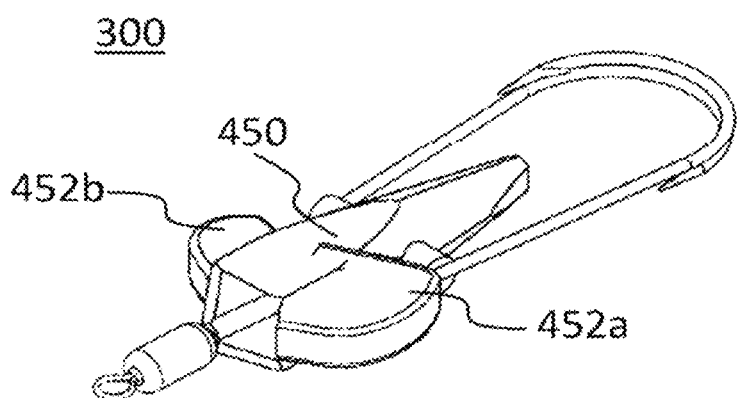

FIG. 4G shows the fully assembled fish lure component 300, with a second housing part 450 cooperating with the first housing part 400 to form a protective enclosure, i.e., the full housing 342. The second housing part 450 is formed with portions 452a and 452b, which define second parts of the extensions 340a and 340b, respectively, of the housing 342. The first housing part 400 and the second housing part 450 may be joined together using any suitable technique. By way of a few specific and non-limiting examples, an adhesive may be applied between the first and second housing parts 400 and 450, thermal joining may be used to create a weld joint between the first and second housing parts 400 and 450, or a mechanical fastener passing through the pivot pin 420 may be used to secure the first and second housing parts 400 and 450 together.

The fish lure component 300 is shown in FIG. 4G in the closed configuration. As will be apparent, based on an inspection of FIG. 4F, when a fish strikes the hook portion of the fish lure component the first and second hook members 430a and 430b can pivot about the pivot pin 420 such that the biasing member 404 is compressed. After the fish has been removed, the biasing member 404 exerts a force that is sufficient to return the first and second hook members 430a and 430b to their original locations shown in FIG. 4F. Preferably, a stop is provided to limit the movement of each of the first and second hook members 430a and 430b, such that the point of each hook member returns to a position in which it is generally aligned with and parallel to the shaft of the other hook member when the fish lure component 300 returns to the closed configuration.

Figure 5A:
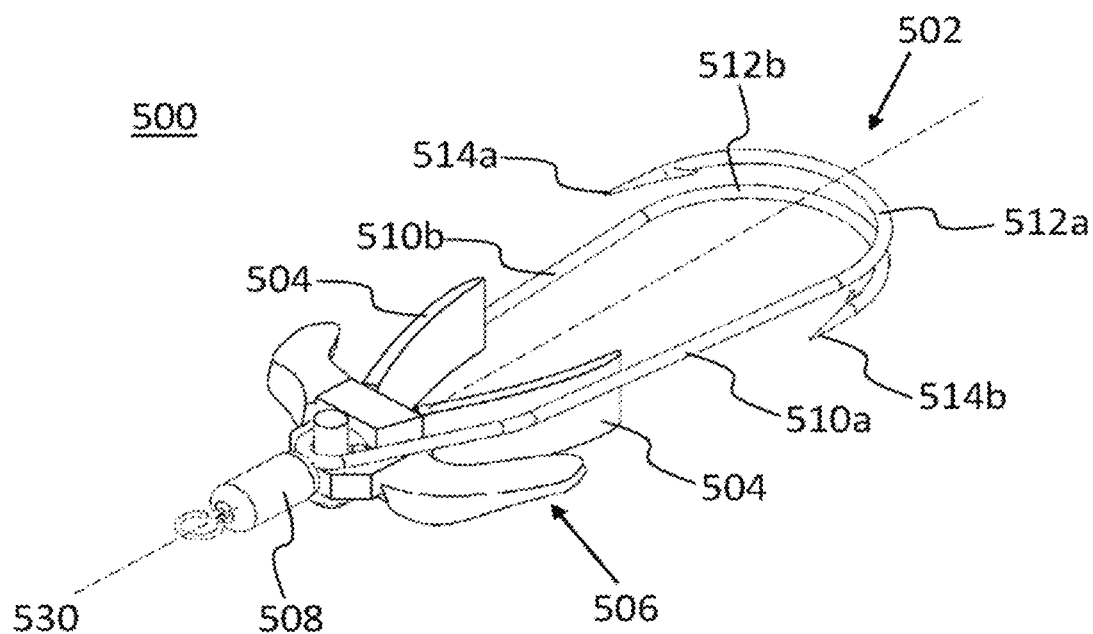
FIG. 5A is a simplified perspective view of a fish lure component according to an embodiment, in a closed configuration.

Referring now to FIGS. 5A-5E, a fish lure component 500 according to an embodiment is shown in a perspective view (in a closed configuration), in a top view (in the closed configuration), in a top view (in an open configuration), in an end view (in the opened configuration) and in a side view, respectively. As shown in FIG. 5A, the fish lure component 500 includes a hook portion shown generally at 502. The hook portion 502 includes a first hook member having a first shank 510a, a first bend 512a and a first point 514a. The hook portion 502 further includes a second hook member having a second shank 510b, a second bend 512b and a second point 514b.

Figure 5B:
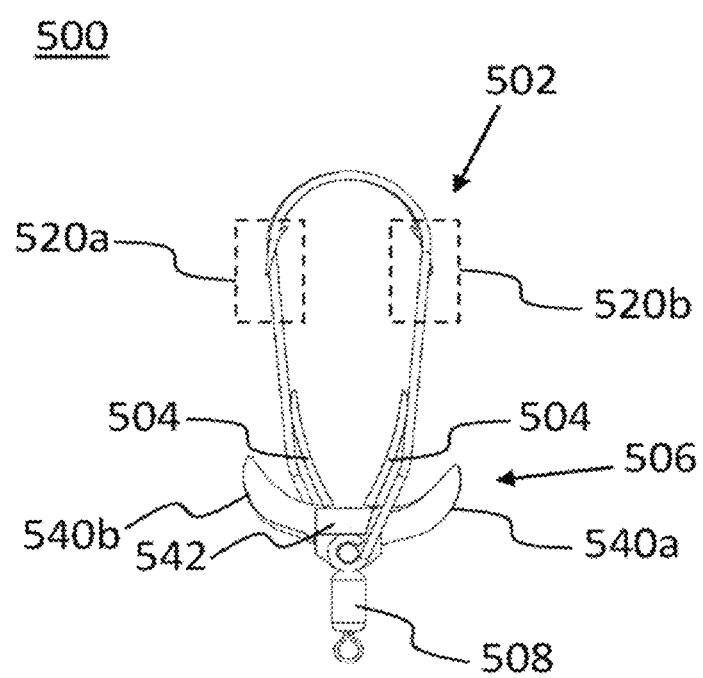
FIG. 5B is a simplified top view of the fish lure component of FIG. 5A, in a closed configuration.

Now referring also to FIG. 5B, the first hook member and the second hook member are disposed in an opposing arrangement, such that the direction of the first bend 512a is opposite the direction of the second bend 512b. Further, the first hook member and the second hook member are disposed in an overlapping and generally parallel arrangement. In particular, within the region that is indicated by the dashed-line box 520a in FIG. 5B, the first point 514a of the first hook member is in an overlapping and generally parallel arrangement with the second shank 510b of the second hook member. Similarly, within the region that is indicated by the dashed-line box 520b in FIG. 5B, the second point 514b of the second hook member is in an overlapping and generally parallel arrangement with the first shank 510a of the first hook member.

A biasing member 504 normally biases the hook portion 502 in the closed configuration that is shown in FIG. 5A and FIG. 5B. In the closed configuration, the shank of one of the hook members protects the hook of the other one of the hook members. In this way, for example, the first point 514a is aligned with and adjacent to the second shank 510b such that the first point 514a is not exposed to the surfaces of submerged obstacles and therefore cannot become snagged on such obstacles. During use, the hook portion 502 is biased into the closed configuration during casting and retrieval or during trolling. The biasing member 504 supplies a biasing force that is sufficient to maintain the hook portion 502 in the closed configuration even during the rotation of the hook portion 502 that is induced by the vane structure 506, and during contact with submerged obstacles. The closed configuration is a "weedless" and "snagless" configuration, since the first and second points 514a and 514b are prevented from becoming entangled in weeds, in addition to being protected from snagging on submerged articles.

A vane structure 506 is provided for causing the hook portion 502 to rotate about the longitudinal axis indicated by the dash-dot line 530 in FIG. 5A. In this embodiment, the vane structure 506 is formed by a pair of wing-shaped or blade-shaped extensions 540a and 540b of a housing 542. The size, shape, vane angle etc., of the extensions 540a and 540b are selected to cause stable rotation of the housing 542, and therefore also the hook portion 502, under typical retrieval rates and for specific characteristics of the fish lure component 500 itself. Since the hook portion 502 is mounted to the housing 542, and rotation between the two is not possible in this embodiment, the hook portion 502 will rotate at the same rate as the housing 542 itself. In order to facilitate rotation of the housing 542 and hook portion 502, the attachment structure 508 is preferably a swivel, such as for instance a barrel swivel.

Figure 5C:
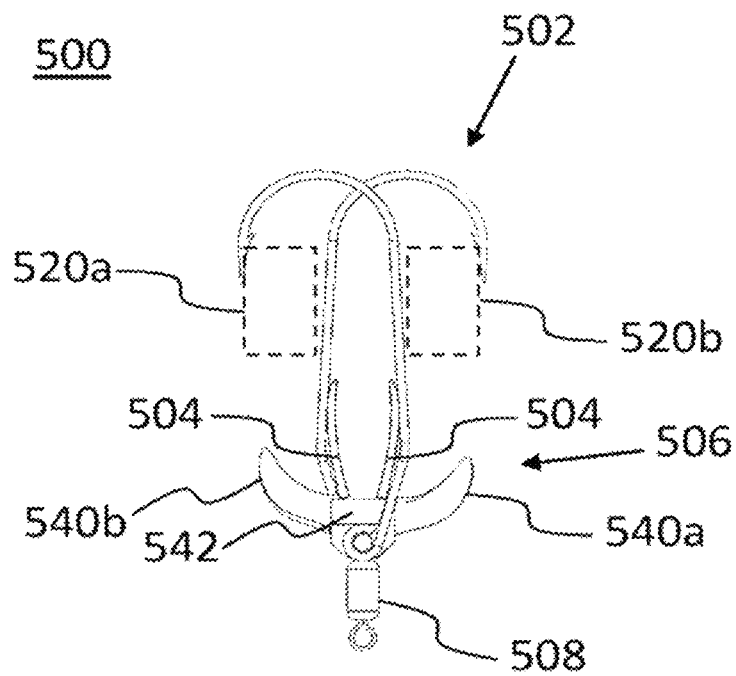
FIG. 5C is a simplified top view of the fish lure component of FIG. 5A, in an opened configuration.

Referring now to FIG. 5C, the fish lure component 500 is shown in an opened configuration. The fish lure component 500 may be in the opened configuration as a result of a fish strike, which acts against the force exerted by the biasing member 504 to pivot the shanks 510a and 510b of the first and second hook members, respectively, toward one another. The first and second points 514a and 514b are both displaced outwardly away from the longitudinal axis 530, such that they are no longer protected by the shanks 510b and 510a, respectively, and are thereby "opened" and exposed for being set into the fish. Advantageously, two separate hook points 514a and 514b are available for being set into the fish. The biasing member 504 stores potential energy when the hook portion 502 is in the open configuration, which is used to return the hook portion 502 to the closed position when the fish is removed therefrom.

In the instant embodiment the biasing member 504 includes a pair of flexible arms extending from the housing 542 into the space between the first shank 510a of the first hook member and the second shank 510b of the second hook member. Preferably, the flexible arms exert a small force against the first and second shanks 510a and 510b when the hook portion 502 is in the closed configuration. In response to a fish strike, the first and second shanks 510a and 510b pivot toward one another about the common pivot pin and cause the flexible arms of the biasing member 504 to reversibly deflect toward one another. When the fish is removed from the hook portion 502, the flexible arms push the first and second hook members back into the closed configuration.

The dashed-line boxes 520a and 520b are shown in FIG. 5C to indicate the protected locations occupied by the first and second points 514a and 514b when the hook portion 502 is in the closed configuration, and to emphasize the extent to which the hook portion 502 may be opened in response to a fish strike.

Figure 5D:
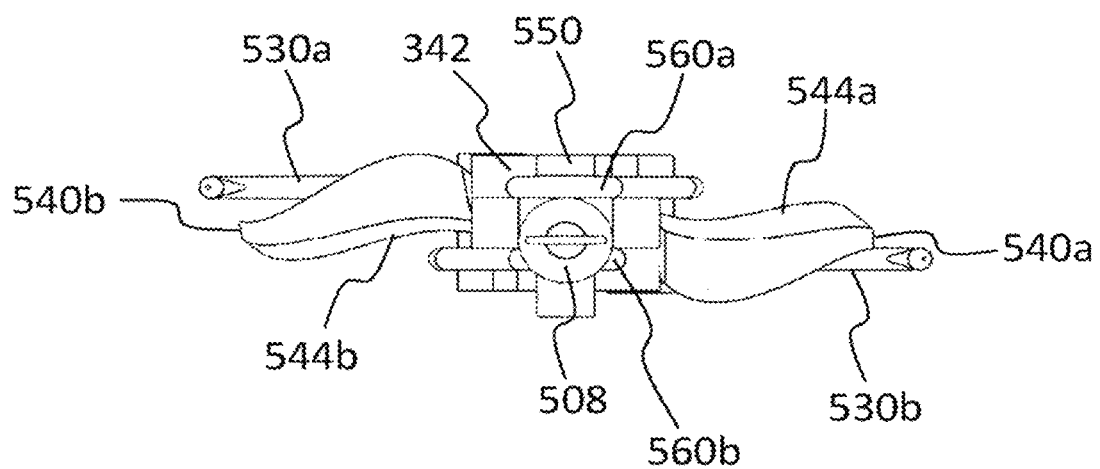
FIG. 5D is a simplified view of the attachment end of the fish lure component of FIG. 5A.
Figure 5E:
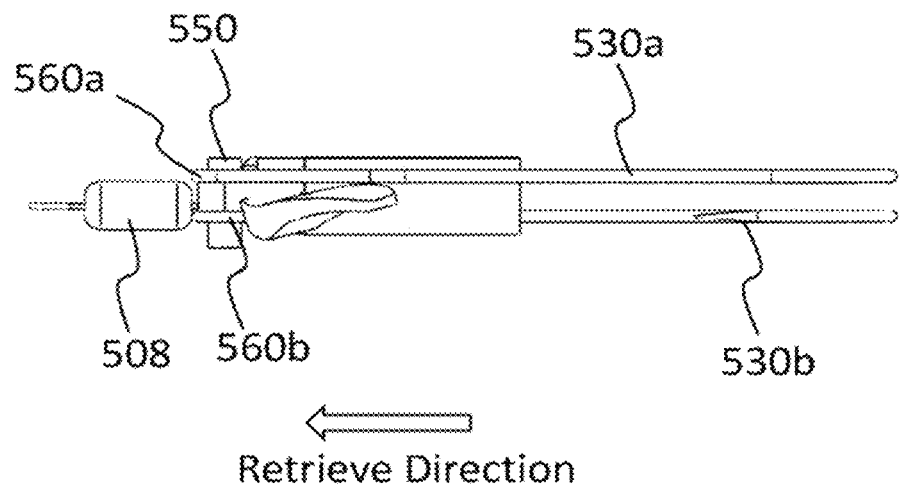
FIG. 5E is a simplified side view of the fish lure component of FIG. 5A.

As shown in FIGS. 5D and 5E, the extensions 540a and 540b of the housing 342 include respective surfaces 544a and 544b, i.e., angled/pitched "leaning surfaces" that generate rotational torque causing the fish lure component 500 to rotate about its longitudinal axis, facilitated by the attachment structure 508 (e.g., barrel swivel), when the fish lure component 500 traverses through a body of water in the direction indicated by the block arrow in FIG. 5E. Of course, the extensions 540a and 540b of the housing 542 also include respective trailing surfaces (not illustrated), which are also shaped to cause rotation of the housing 542 when the fish lure component 500 moves relative to the water in the retrieve direction indicated by the block arrow in FIG. 5E.

FIGS. 5D and 5E show additional detail of the assembly of individual elements in the fish lure component 500. In particular, a pivot pin 550, also referred to as the common pivot pin, extends through the housing 542. The first and second hook members 530a and 530b each have a ring-shaped structure, 560a and 560b, respectively, formed at an end thereof that is opposite the point end. The attachment structure 508 similarly has a ring-shaped structure (not illustrated). The pivot pin 520 passes through the ring-shaped structure of each of the first and second hook members 530a and 530b and the attachment structure 508, thereby securing each of said elements whilst supporting independent pivoting movement of said elements about the common pivot pin.

Figure 6A:
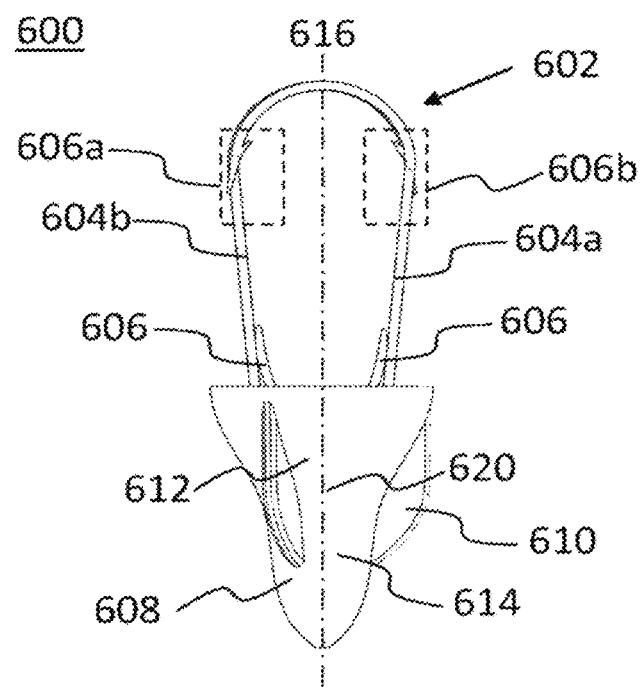
FIG. 6A is a simplified top view of a fish lure component with a cover defining a vane structure according to an embodiment, in a closed configuration.
Figure 6B:
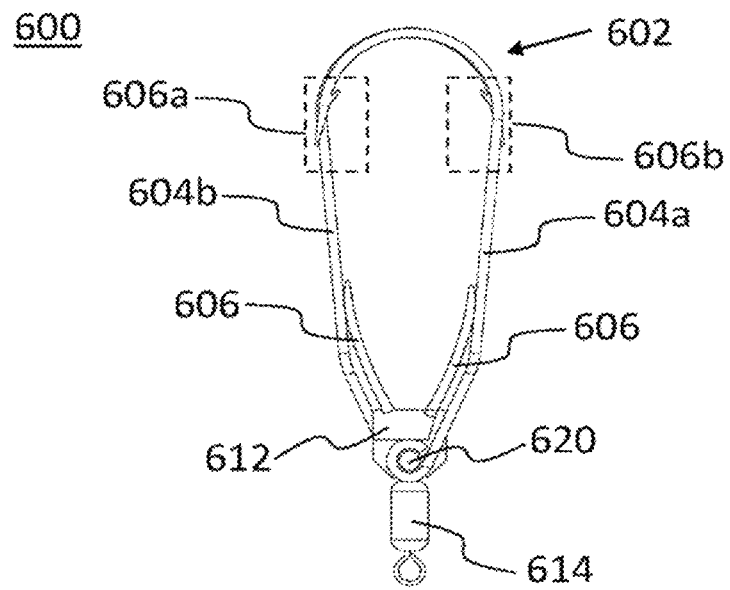
FIG. 6B is a simplified top view of the fish lure component of FIG. 6A with the cover removed.

Referring now to FIG. 6A, shown is a simplified top view of a fish lure component 600 with a cover defining a vane structure according to an embodiment, in a closed configuration. FIG. 6B shows the fish lure component 600 with the cover removed. As shown in FIG. 6A, the fish lure component 600 includes a hook portion shown generally at 602. The hook portion 602 includes a first hook member 604a having a first shank, a first bend and a first point. The hook portion 602 further includes a second hook member 604b having a second shank, a second bend and a second point.

The first hook member 604a and the second hook member 604b are disposed in an opposing, overlapping and generally parallel arrangement. As such, within the region that is indicated by the dashed-line box 606a in FIG. 6A, the first point of the first hook member 604a is in an overlapping and generally parallel arrangement with the second shank of the second hook member 604b. Similarly, within the region that is indicated by the dashed-line box 606b in FIG. 6A, the second point of the second hook member 604b is in an overlapping and generally parallel arrangement with the first shank of the first hook member 604a.

A cover 608 is provide, which has an external surface defining a vane structure 610 (one vane is shown in FIG. 6A). The cover 608 surrounds a housing 612 and an attachment structure 614. A pivot pin 620 is retained in the housing 612, to which the first and second hook members 604a and 604b are pivotably mounted. The attachment structure 614 is also mounted to the pivot pin 620. For instance, the first and second hook members 604a and 604b each have a ring-shaped structure formed at an end thereof that is opposite the point end. The attachment structure 614 similarly has a ring-shaped structure. The pivot pin 620 passes through the ring-shaped structure of each of the first and second hook members 604a and 604b and the attachment structure 620, thereby securing each of said elements in place whilst supporting independent pivoting movement of said elements about the pivot pin 620.

The vane structure 610 is provided for causing the hook portion 602 to rotate about the longitudinal axis indicated by the dash-dot line 616 in FIG. 6A. The size, shape, vane angle etc., of the extensions vane structure 610 are selected to cause stable rotation of the housing fish lure component 600, under typical retrieval rates and for specific characteristics of the fish lure component 600 itself. In order to facilitate rotation of the fish lure component 600, the attachment structure 614 is preferably a swivel, such as for instance a barrel swivel.

A biasing member 606 normally biases the hook portion 602 in the closed configuration that is shown in FIGS. 6A and 6B. The biasing member 606 supplies a biasing force that is sufficient to maintain the hook portion 602 in the closed configuration even during the rotation of the hook portion 602 that is induced by the vane structure 610, and during contact with submerged obstacles, etc. In the closed configuration, the shank of one of the hook members protects the point of the other one of the hook members, as described above. The closed configuration is considered to be a "weedless" and "snagless" configuration, since the points of the first and second hook members 604a and 604b are prevented from becoming entangled in weeds, in addition to being protected from snagging on submerged articles.

In the instant embodiment the biasing member 606 includes a pair of flexible arms extending from the housing 612 into the space between the first hook member 604a and the second hook member 604b. Preferably, the flexible arms exert a small force against the shanks of the first hook member 604a and the second hook member 604b when the hook portion 602 is in the closed configuration. In response to a fish strike, the shanks of the first hook member 604a and the second hook member 604b pivot toward one another about the pivot pin 620 and cause the flexible arms of the biasing member 606 to reversibly deflect toward one another. When the fish is removed from the hook portion 602, the flexible arms push the first and second hook members 604a and 604b back into the closed configuration.

Figure 7A:
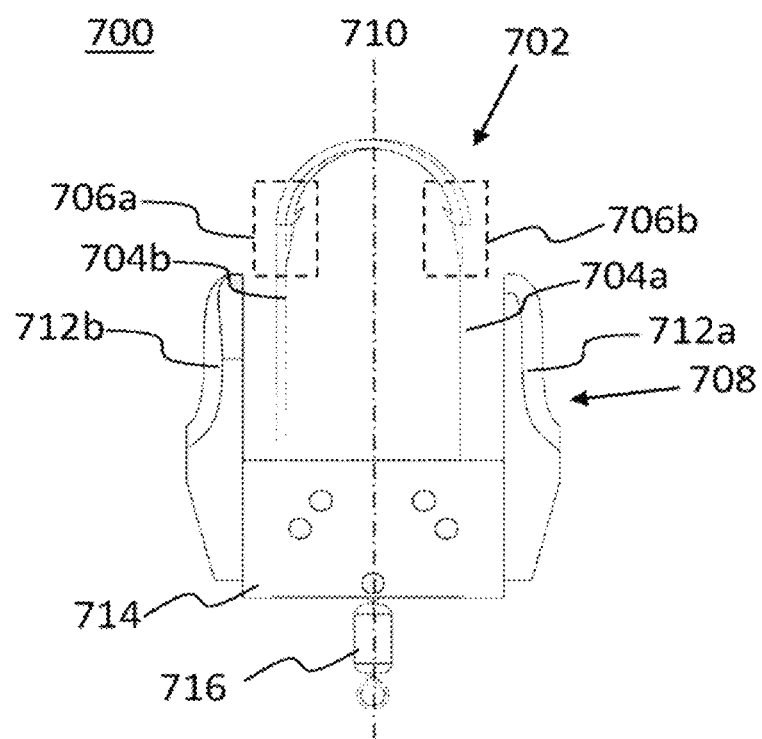
FIG. 7A is a simplified top view of a fish lure component according to an embodiment, in a closed configuration.
Figure 7B:
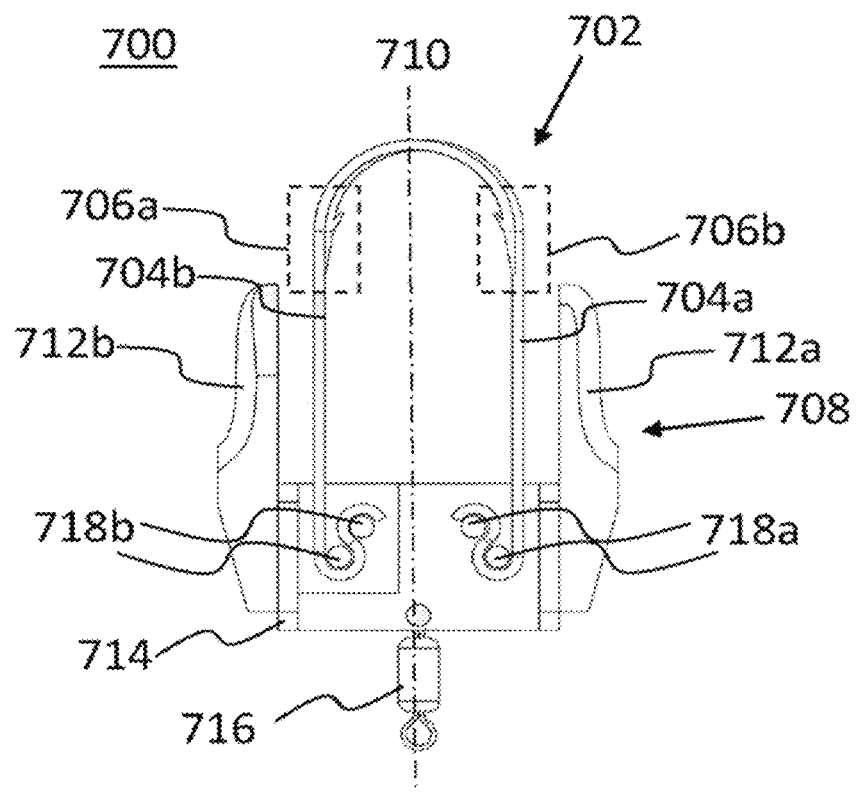
FIG. 7B is a simplified top view of the fish lure component of FIG. 7A, with a portion of the housing removed, in the closed configuration.

Referring now to FIG. 7A, shown is a simplified top view of a fish lure component 700 according to an embodiment, in a closed configuration. FIG. 7B shows an internal view of the fish lure component 700 with a portion of its housing removed. As shown in FIG. 7A, the fish lure component 700 includes a hook portion shown generally at 702. The hook portion 702 includes a first hook member 704a having a first shank, a first bend and a first point. The hook portion 702 further includes a second hook member 704b having a second shank, a second bend and a second point.

The first hook member 704a and the second hook member 704b are disposed in an opposing, overlapping and generally parallel arrangement. As such, within the region that is indicated by the dashed-line box 706a in FIG. 7A, the first point of the first hook member 704a is in an overlapping and generally parallel arrangement with the second shank of the second hook member 704b. Similarly, within the region that is indicated by the dashed-line box 706b in FIG. 7A, the second point of the second hook member 704b is in an overlapping and generally parallel arrangement with the first shank of the first hook member 704a.

A vane structure 708 is provided for causing the hook portion 702 to rotate about the longitudinal axis indicated by the dash-dot line 710 in FIG. 7A. In this embodiment, the vane structure 708 is formed by a pair of wing-shaped or blade-shaped extensions 712a and 712b of a housing 714. The size, shape, vane angle etc., of the extensions 712a and 712b are selected to cause stable rotation of the housing 714, and therefore also the hook portion 702, under typical retrieval rates and for specific characteristics of the fish lure component 700 itself. Since the hook portion 702 is mounted to the housing 714, and rotation between the two is not possible in this embodiment, the hook portion 702 will rotate at the same rate as the housing 714 itself. In order to facilitate rotation of the housing 714 and hook portion 702, the attachment structure 716 is preferably a swivel, such as for instance a barrel swivel.

A biasing member, in the form of a plurality of pins 718a and 718b, cooperate with generally S-shaped ends of the first and second hook members 704a and 704b to normally bias the hook portion 702 in the closed configuration that is shown in FIGS. 7A and 7B. In the closed configuration, the shank of one of the hook members protects the point of the other one of the hook members, as described above. The closed configuration is considered to be a "weedless" and "snagless" configuration, since the points of the first and second hook members 704a and 704b are prevented from becoming entangled in weeds, in addition to being protected from snagging on submerged articles. In response to a fish strike, the shanks of the first and second hook members 704a and 704b pivot toward one another. Since the ends of the first and second hook members 704a and 704b are not permitted to pivot, the shanks of the first and second hook members 704a and 704b store potential energy, such that when the fish is removed from the hook portion 702, the shanks of the first and second hook members 704a and 704b spring back and the hook portion 702 returns to the closed configuration.

Figure 8:
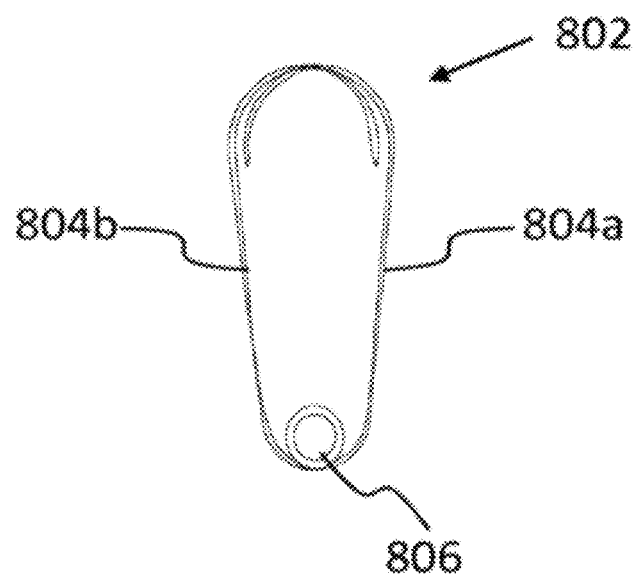
FIG. 8 is a simplified diagram showing a hook portion fabricated from a single wire, according to an embodiment.

FIG. 8 shows an alternative type of hook portion, which is formed from a single piece of wire that is bent in such a way that it forms a hook portion 802 having first and second hook member portions 804a and 804b. In addition, the bending of the wire may form a coil 806 that is capable of serving as a biasing member for normally biasing the first and second hook member portions 804a and 804b in the closed configuration shown in FIG. 8. Certain embodiments described above, such as for instance at least the embodiments described with reference to FIGS. 3A-6B, are capable of being modified to use a hook portion similar to hook portion 802.

FIGS. 9-12 illustrate some specific and non-limiting ways in which the fish lure components described above may be incorporated into fishing lures. Although FIGS. 9-12 show specific examples using the fish lure component 300, it is to be understood that any of the fish lure components described above or below (i.e., fish lure components 200, 300, 500, 600, 700, 1300, 1400) may be used alone or in combination with one another in the various arrangements shown in FIGS. 9-12.

Figure 9:
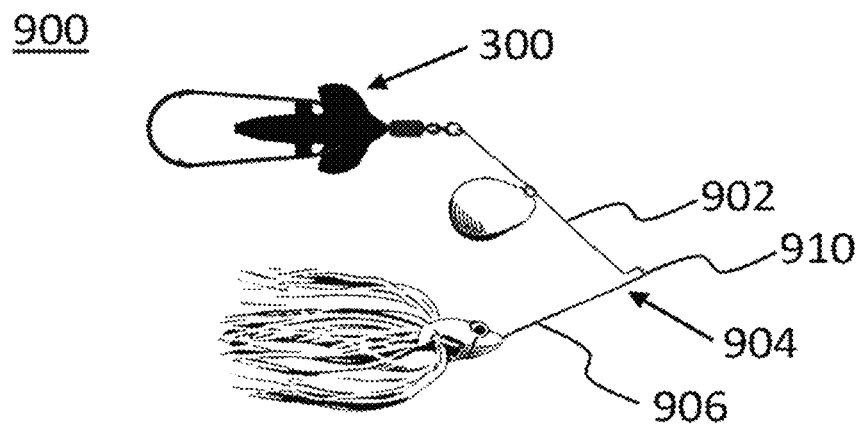
FIG. 9 is a simplified diagram showing a modified overhead arm spinnerbait, including the fishing lure component of FIG. 3A mounted at the end of the overhead arm, according to an embodiment.

FIG. 9 illustrates a fish lure 900 similar to a prior art "safety pin" or overhead arm spinner bait. In fish lure 900, the fish lure component 300 is attached to the overhead arm 902 of frame 904 instead of a prior art blade. Advantageously, a fish strike on the overhead arm may result in the hooks of fish lure component 300 being set into the fish. On the other hand, a fish strike on the base arm 906 may result in the single hook 908 being set into the fish. The lure 900 may be secured to a fishing line or snap lure connector, etc., via attachment structure 910.

Figure 10:
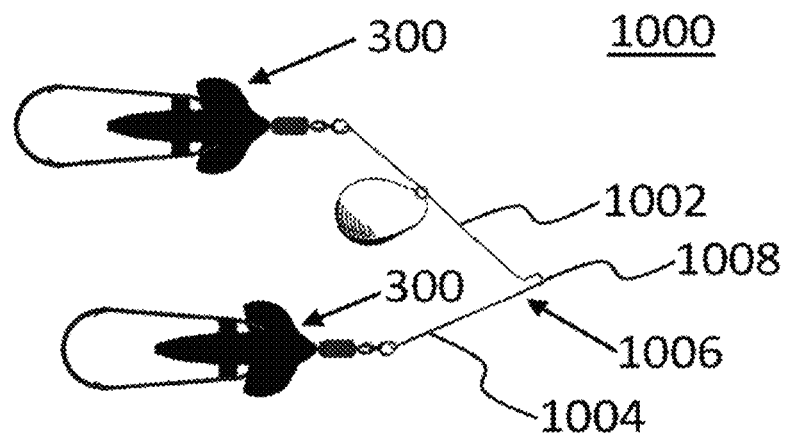
FIG. 10 is a simplified diagram showing an overhead arm spinnerbait style frame with the fishing lure component of FIG. 3A mounted at the end of each of the overhead arm and the base arm, according to an embodiment.

FIG. 10 illustrates a fish lure 1000 that is also similar to a prior art "safety pin" or overhead arm spinner bait. In fish lure 1000, the fish lure component 300 is attached to both the overhead arm 1002 and the base arm 1004 of frame 1006. Advantageously, a fish strike on the overhead arm 1002 or the base arm 1004 may result in the hooks of fish lure component 300 being set into the fish. The lure 1000 may be secured to a fishing line or snap lure connector, etc., via attachment structure 1008.

Figure 11:
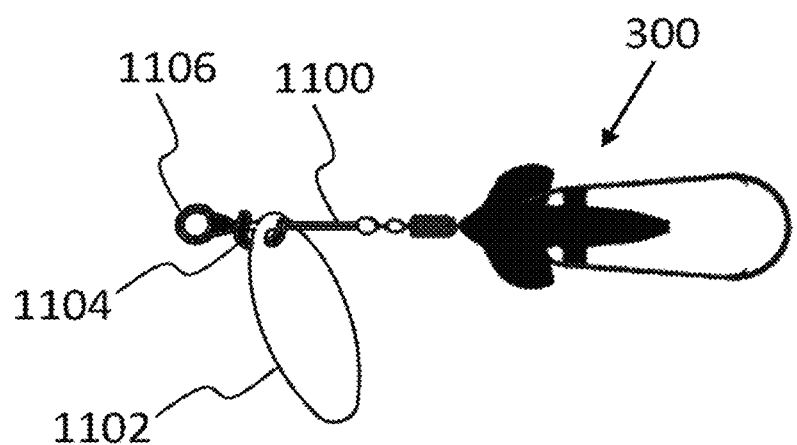
FIG. 11 is a simplified diagram showing a modified in-line spinnerbait, including the fishing lure component of FIG. 3A mounted at an end of the frame opposite an attachment structure, according to an embodiment.

FIG. 11 illustrates a fish lure 1100 similar to a prior art "in-line" spinner bait. In fish lure 1100, the fish lure component 300 is attached to the frame 1102 "down line" from a conventional blade 1104, which is also mounted to the frame 1102 via a clevis 1104. The lure 1100 may be secured to a fishing line or snap lure connector, etc., via attachment structure 1106.

Figure 12:
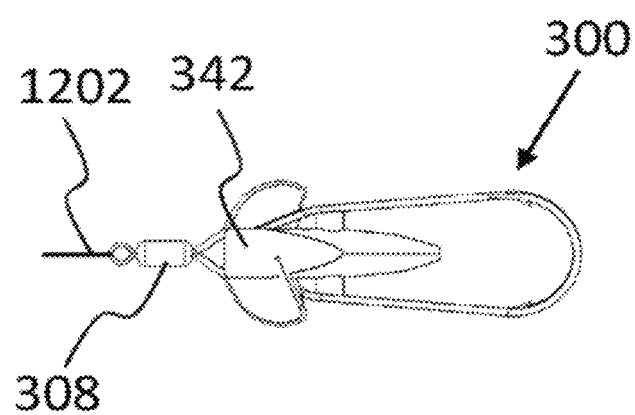
FIG. 12 is a simplified diagram showing the fishing lure component of FIG. 3A implemented as a stand-alone fishing lure.

FIG. 12 illustrates the fishing lure component of FIG. 3A implemented as a stand-alone fishing lure 1200. The lure 1200 may be secured directly to a fishing line 1202, or it may be secured to a not illustrated snap lure connector, etc., via connector 308. Since the stand-alone fishing lure 1200 does not include any additional blades etc., the housing 342 may be at least partially fabricated from or coated with a shiny and/or reflective material to create a flash for attracting fish.

Figure 13A:
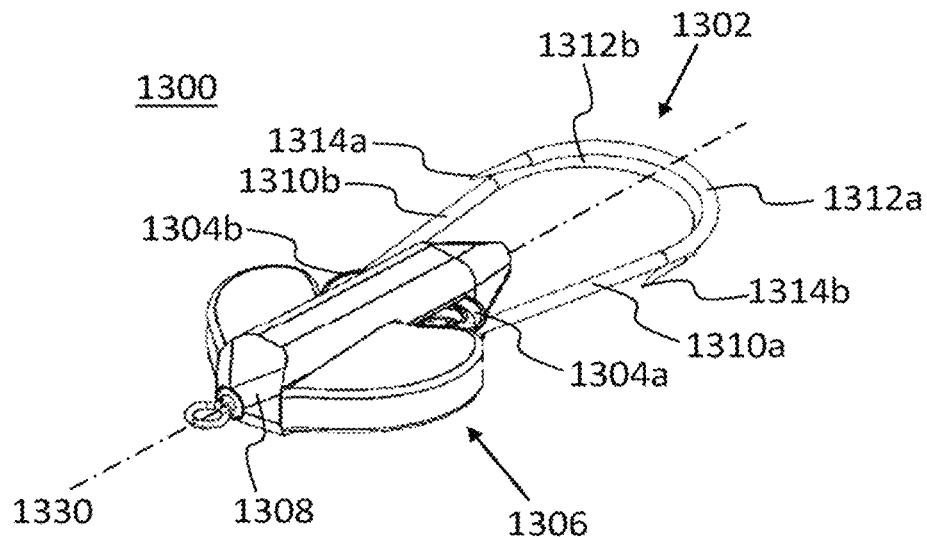
FIG. 13A is a simplified perspective view of a fish lure component according to an embodiment, in a closed configuration.

Referring now to FIG. 13A, shown is a simplified perspective view of yet another fish lure component 1300 according to an embodiment, in a closed configuration. The fish lure component 1300 includes a hook portion shown generally at 1302. The hook portion 1302 includes a first hook member having a first shank 1310a, a first bend 1312a and a first point 1314a. The hook portion 1302 further includes a second hook member having a second shank 1310b, a second bend 1312b and a second point 1314b.

Figure 13B:
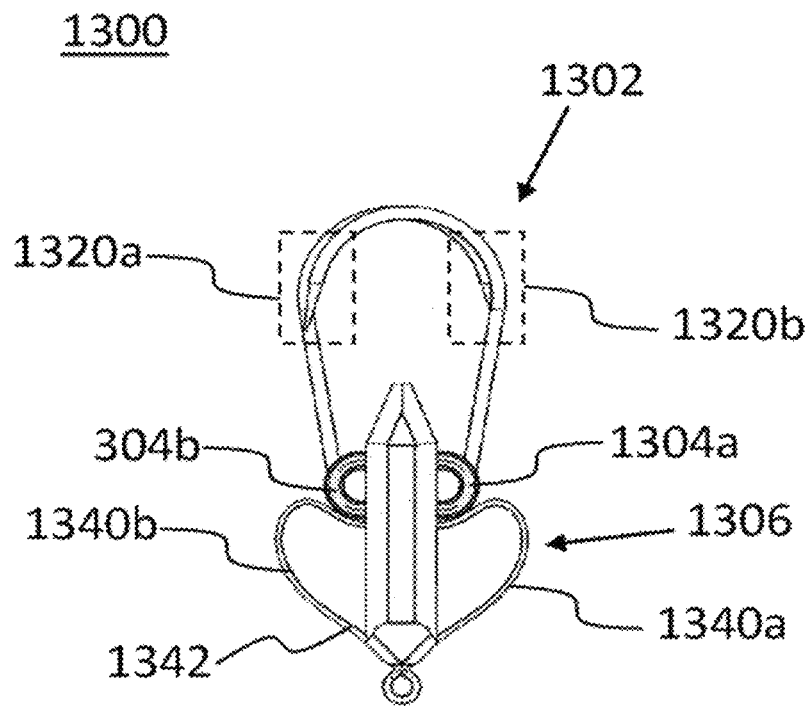
FIG. 13B is a simplified top view of the fish lure component of FIG. 13A, in the closed configuration.

Now referring also to FIG. 13B, the first hook member and the second hook member are disposed in an opposing arrangement, such that the direction of the first bend 1312a is opposite the direction of the second bend 1312b. Further, the first hook member and the second hook member are disposed in an overlapping and generally parallel arrangement. In particular, within the region that is indicated by the dashed-line box 1320a in FIG. 13B, the first point 1314a of the first hook member is in an overlapping and generally parallel arrangement with the second shank 1310b of the second hook member. Similarly, within the region that is indicated by the dashed-line box 1320b in FIG. 13B, the second point 1314b of the second hook member is in an overlapping and generally parallel arrangement with the first shank 1310a of the first hook member.

A biasing member 1304a and 1304b normally biases the hook portion 1302 in the closed configuration that is shown in FIG. 13A and FIG. 13B. In the closed configuration, the shank of one of the hook members protects the hook of the other one of the hook members. In this way, for example, the first point 1314a is aligned with and adjacent to the second shank 1310*b* such that the first point 1314*a* is not exposed to the surfaces of submerged obstacles and therefore cannot become snagged on such obstacles. During use, the hook portion 1302 is biased into the closed configuration during casting and retrieval, or alternatively during trolling. The biasing member 1304*a* and 1304*b* supplies a biasing force that is sufficient to maintain the hook portion 1302 in the closed configuration even during the rotation of the hook portion 1302 that is induced by the vane structure 1306 and during contact with submerged obstacles. The closed configuration is a "weedless" and "snagless" configuration, since the first and second points 1314*a* and 1314*b* are prevented from becoming entangled in weeds, in addition to being protected from snagging on submerged articles.

In the instant embodiment, the biasing member is fabricated from a resiliently deformable material. By way of a specific and non-limiting example, the biasing member comprises a pair of O-rings, in particular a first O-ring 1304*a* and a second O-ring 1304*b*. Preferably, the O-rings 1304*a* and 1304*b* are x-profile O-rings, which include a concave shaped outer surface that faces the respective shank 1310*a* or 1310*b* of the first and second hook members. The concave shaped outer surface of the O-rings receives the respective shanks of the hook members, so as to reduce the likelihood of the O-rings slipping off the shanks. The O-rings 1304*a* and 1304*b* are retained by a housing 1342 and extend away from opposite sides of the housing 1342 toward the respective shank 1310*a* or 1310*b*. Alternatively, the biasing member is a unified component that is formed with two O-ring type portions, which function similarly to the separate O-rings 1304*a* and 1304*b*, and a central portion (not illustrated) that is retained by the housing. Further alternatively, the biasing member is a single, circular O-ring. By way of a specific and non-limiting example, Shore A 70 durometer x-profile O-rings are suitable for use as the biasing member, although materials of other harnesses may be required for specific applications. In general, a suitable O-ring provides enough tension to maintain the hook members in the open configuration during retrieval or trolling, and reversibly collapses or deforms with minimal force when a fish strikes.

A vane structure 1306 is provided for causing the hook portion 1302 to rotate about the longitudinal axis indicated by the dash-dot line 1330 in FIG. 13A. In this embodiment, the vane structure 1306 is formed by a pair of wing-shaped or blade-shaped extensions 1340*a* and 1340*b* of a housing 1342, as illustrated most clearly in FIG. 13B. The size, shape, vane angle etc., of the extensions 1340*a* and 1340*b* are selected to cause stable rotation of the housing 1342, and therefore also the hook portion 1302, under typical retrieval or trolling rates and for specific characteristic of the fish lure component 1300 itself. Since the hook portion 1302 is mounted in the housing 1342, and rotation between the two is not possible in this embodiment, the hook portion 1302 will rotate at the same rate as the housing 1342 itself. In order to facilitate rotation of the housing 1342 and hook portion 1302, the attachment structure 1308 is preferably a swivel, such as for instance a barrel swivel.

Figure 13C:
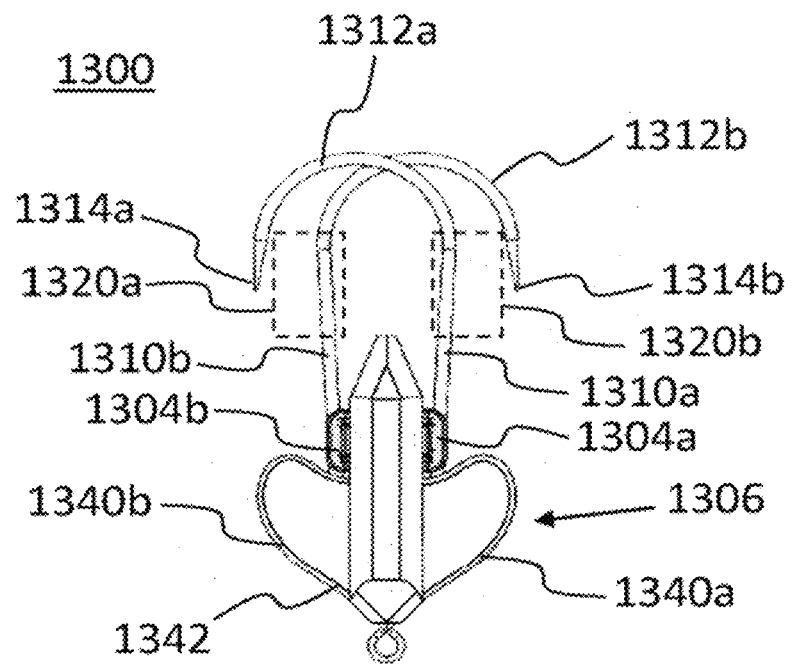
FIG. 13C is a simplified top view of the fish lure component of FIG. 13A, in the opened configuration.

Referring now to FIG. 13C, the fish lure component 1300 is shown in an opened configuration. The fish lure component 1300 may be in the opened configuration as a result of a fish strike, which acts against the force exerted by the biasing member 1304*a* and 1304*b* to pivot the shanks 1310*a* and 1310*b* of the first and second hook members, respectively, toward one another. The first and second points 1314*a* and 1314*b* are both displaced outwardly away from the longitudinal axis 1330, such that they are no longer protected by the shanks 1310*b* and 1310*a*, respectively, and are thereby "opened" and exposed for being set into the fish. Advantageously, two separate hook points 1314*a* and 1314*b* are available for being set into the fish. The biasing member 1304*a* and 1304*b* stores potential energy when the hook portion 1302 is in the open configuration, which is used to return the hook portion to the closed position when the fish is removed from the hook portion. The dashed-line boxes 1320*a* and 1320*b* are shown in FIG. 13C to indicate the protected locations occupied by the first and second points 1314*a* and 1314*b* when the hook portion is in the closed configuration, and to emphasize the extent to which the hook portion 1302 may be opened in response to a fish strike.

Figure 13D:
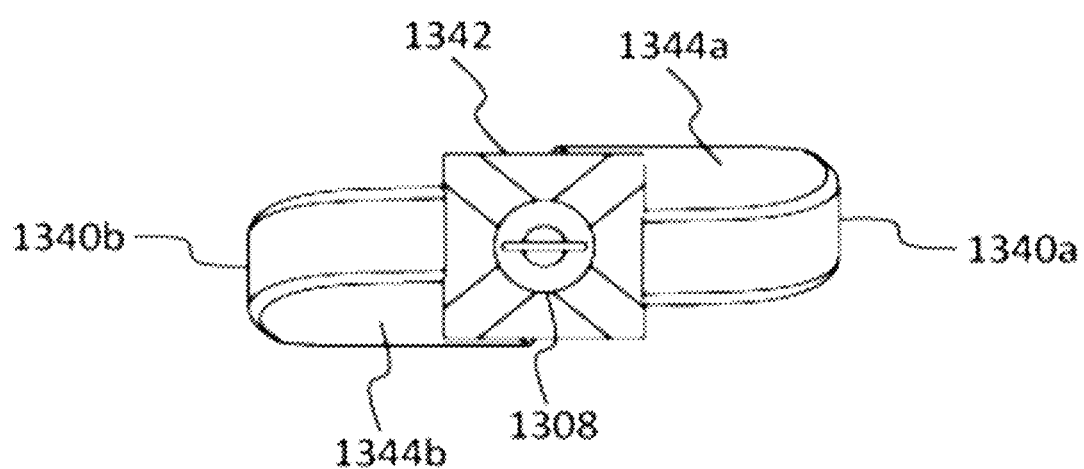
FIG. 13D is a simplified view of the attachment end of the fish lure component of FIG. 13A.
Figure 13E:
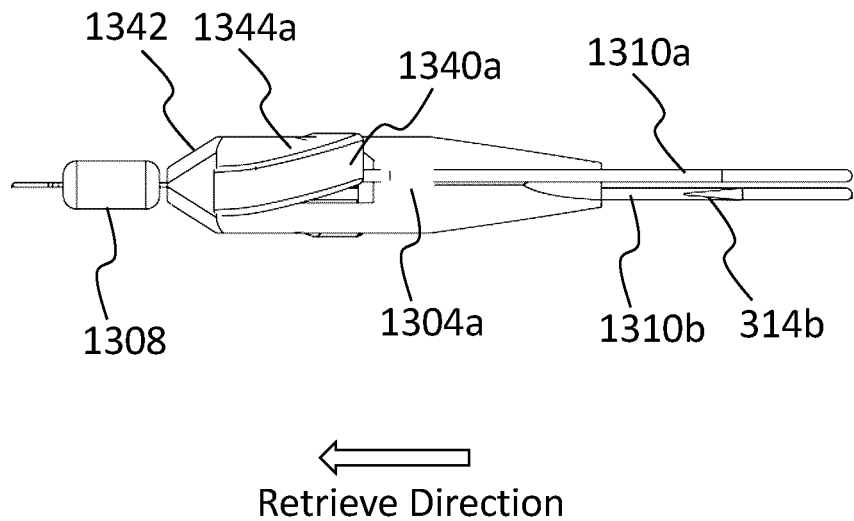
FIG. 13E is a simplified side view of the fish lure component of FIG. 13A.

As shown in FIGS. 13D and 13E, the extensions 1340*a* and 1340*b* of the housing 1342 include respective surfaces 1344*a* and 1344*b*, i.e., angled/pitched "leaning surfaces" that generate rotational torque causing the fish lure component 1300 to rotate about its longitudinal axis, facilitated by the attachment structure 1308 (e.g., barrel swivel), when the fish lure component 1300 traverses through a body of water in the direction indicated by the block arrow in FIG. 13E. Of course, the extensions 1340*a* and 1340*b* of the housing 1342 also include respective trailing surfaces (not illustrated), which are also shaped to cause rotation of the housing 1342 when the fish lure component 1300 moves relative to the water in the retrieve direction indicated by the block arrow in FIG. 13E.

Figure 14A:
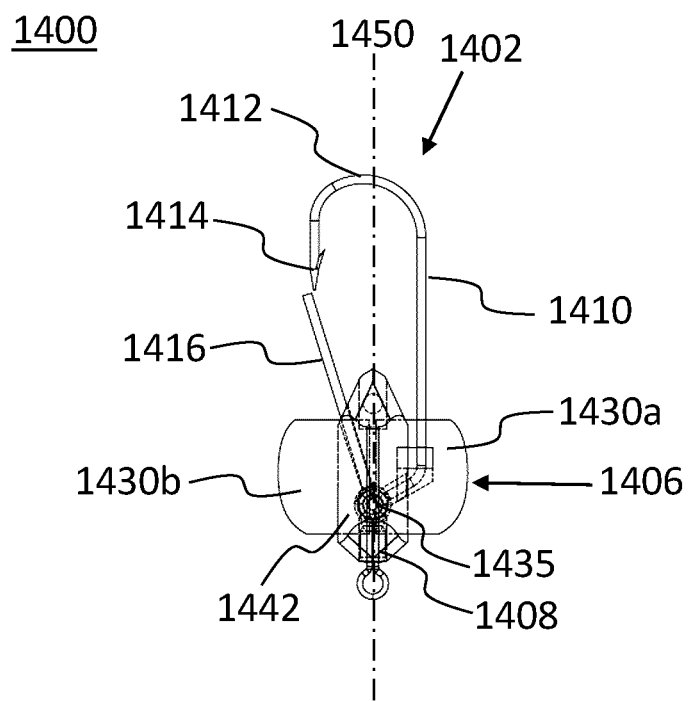
FIG. 14A is a simplified top view of another fish lure component according to an embodiment.

Referring now to FIG. 14A, shown is a simplified perspective view of yet another fish lure component 1400 according to an embodiment. The fish lure component 1400 includes a hook portion shown generally at 1402. The hook portion 1402 includes a hook member having a shank 1410, a bend 1412 and a point 1414. The hook portion 1402 further includes a weed guard 1416. The weed guard 1416 is normally biased in the configuration shown in FIG. 14A so as to prevent the point 1414 from becoming snagged on weeds, logs, etc.

The shank 1410 of the hook portion 1402 is fixedly secured within a housing 1442. For instance, an end of the shank 1410 opposite the point 1414 is mounted on a pin 1435 that is retained by the housing 1442. The pin 1435 is formed of a metal such as steel or another suitably hard material. In the instant example, one end of the weed guard 1416 is pivotably mounted to the pin 1435. When a fish strikes the hook portion 1402, the weed guard 1416 is displaced inwardly toward the shank 1410 thereby exposing the point 1414 to be set into the fish's mouth. In some embodiments, the weed guard 1416 is omitted, such that the hook portion 1402 comprises a bare single hook.

A vane structure 1406 is provided for causing the hook portion 1402 to rotate about the longitudinal axis indicated by the dash-dot line 1450 in FIG. 14A. In this embodiment, the vane structure 1406 is formed by a pair of wing-shaped or blade-shaped extensions 1430*a* and 1430*b* of the housing 1442. The size, shape, vane angle etc., of the extensions 1430*a* and 1430*b* are selected to cause stable rotation of the housing 1442, and therefore also the hook portion 1402, under typical retrieval or trolling rates and for specific characteristic of the fish lure component 1400 itself. Since the hook portion 1402 is mounted in the housing 1442, and rotation between the two is not possible in this embodiment, the hook portion 1402 will rotate at the same rate as the housing 1442 itself. In order to facilitate rotation of the housing 1442 and hook portion 1402, the attachment structure 1408 is preferably a swivel, such as for instance a barrel swivel.

Figure 14B:
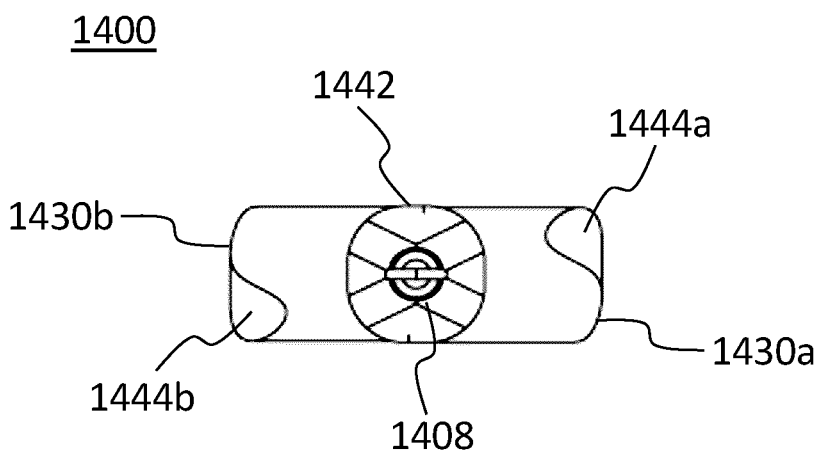
FIG. 14B is a simplified view of the attachment end of the fish lure component of FIG. 14A.
Figure 14C:
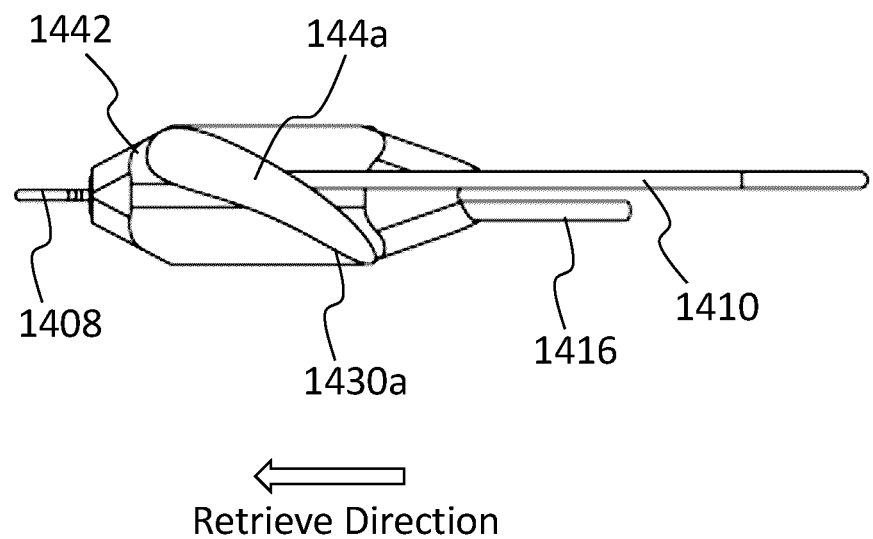
FIG. 14C is a simplified side view of the fish lure component of FIG. 14A.

As shown in FIGS. 14B and 14C, the extensions 1430*a* and 1430*b* of the housing 1442 include respective surfaces 1444a and 1444b, i.e., angled/pitched "leaning surfaces" that generate rotational torque causing the fish lure component 1400 to rotate about its longitudinal axis 1450, facilitated by the attachment structure 1408 (e.g., barrel swivel), when the fish lure component 1400 traverses through a body of water in the direction indicated by the block arrow in FIG. 14C. Of course, the extensions 1430a and 1430b of the housing 1442 also include respective trailing surfaces (not illustrated), which are also shaped to cause rotation of the housing 1442 when the fish lure component 1400 moves relative to the water in the retrieve direction indicated by the block arrow in FIG. 14C.

In the description of the invention herein, it is understood that a word appearing in the singular encompasses its plural counterpart, and a word appearing in the plural encompasses its singular counterpart, unless implicitly or explicitly understood or stated otherwise. For instance, unless the context indicates otherwise, a singular reference, such as "a" or "an" means "one or more". Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. It is also to be understood, where appropriate, like reference numerals may refer to corresponding parts throughout the several views of the drawings for simplicity of understanding.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A fish lure component, comprising:
 a housing having external surfaces that define rotation inducing surfaces of a vane structure and that are configured to rotate the housing about an axis thereof during movement of the housing through a body of water in a direction that is generally aligned with the axis; and
 a hook portion pivotably coupled to the housing;
 wherein the housing communicates with the hook portion such that rotational motion of the housing is transferred to the hook portion and thereby causing the housing and the hook portion to rotate together during use;
 wherein the hook portion comprises first and second hook members disposed in an opposing arrangement, wherein each one of the first and second hook members includes a shank. a bend and a point, and wherein a bend direction of the first hook member is opposite a bend direction of the second hook member such that the point of each one of the first and second hook members is disposed in an overlapping and generally parallel arrangement with the shank of the other one of the first and second hook members when the hook portion is in a closed configuration; and
 further comprising a biasing member for normally biasing the hook portion in the closed configuration, wherein the hook portion is operable between the closed configuration and an open configuration in response to a fish strike on the hook portion;
 wherein the biasing member comprises at least one band of a resiliently deformable material disposed between the shank of the first hook member and the shank of the second hook member.

2. The fish lure component of claim 1, comprising an attachment structure configured for coupling the fish lure component to a frame.

3. The fish lure component of claim 1, comprising a pivot pin fixedly secured within the housing, and wherein the hook portion is pivotably coupled to the housing via the pivot pin.

4. The fish lure component of claim 1, wherein the at least one band of a resiliently deformable material is a pair of O-rings disposed between the shank of the first hook member and the shank of the second hook member.

5. The fish lure component of claim 4, wherein each O-ring of the pair of O-rings is an x-profile O-ring having a convex outer surface that is sized to receive a respective one of the shank of the first hook member and the shank of the second hook member.

6. The fish lure component of claim 1, wherein the at least one band of a resiliently deformable material is a single O-ring disposed between the shank of the first hook member and the shank of the second hook member.

7. The fish lure component of claim 6, wherein the single O-ring is a circular O-ring.

8. A fish lure, comprising:
 a frame having a first arm portion and a second arm portion forming a generally V-shape, the first arm portion extending to a first end of the frame and the second arm portion extending to a second end of the frame; and
 a first assembly coupled to the first end of the frame;
 wherein the first assembly comprises the following elements:
  a housing having external surfaces that define rotation inducing surfaces of a vane structure and that are configured to rotate the housing about an axis thereof during movement of the housing through a body of water in a direction that is generally aligned with the axis; and
  a hook portion pivotably coupled to the housing;

wherein the housing communicates with the hook portion such that rotational motion of the housing is transferred to the hook portion and thereby causing the housing and the hook portion to rotate together during use;

wherein the hook portion comprises first and second hook members disposed in an opposing arrangement, wherein each one of the first and second hook members includes a shank. a bend and a point, and wherein a bend direction of the first hook member is opposite a bend direction of the second hook member such that the point of each one of the first and second hook members is disposed in an overlapping and generally parallel arrangement with the shank of the other one of the first and second hook members when the hook portion is in a closed configuration; and further comprising a biasing member for normally biasing the hook portion in the closed configuration, wherein the hook portion is operable between the closed configuration and an open configuration in response to a fish strike on the hook portion;

wherein the biasing member comprises at least one band of a resiliently deformable material disposed between the shank of the first hook member and the shank of the second hook member.

9. The fish lure of claim 8, comprising:
a second assembly coupled to the second end of the frame;
wherein the second assembly comprises the following elements:
a housing having external surfaces that define rotation inducing surfaces of a vane structure and that are configured to rotate the housing about an axis thereof during movement of the housing through a body of water in a direction that is generally aligned with the axis; and
a hook portion pivotably coupled to the housing;
wherein the housing communicates with the hook portion such that rotational motion of the housing is transferred to the hook portion and thereby causing the housing and the hook portion to rotate together during use.

10. The fish lure of claim 9, wherein the hook portion of the second assembly is pivotably mounted to a pivot pin disposed within the housing of the second assembly, and wherein the hook portion of the second assembly comprises a single hook and a weed guard that is operable between a first configuration for protecting the single hook from snags during movement through the body of water and a second configuration for setting the single hook in a fish's mouth in response to a fish strike on the hook portion.

11. The fish lure of claim 9, wherein the hook portion of the second assembly is pivotably mounted to a pivot pin disposed within the housing of the second assembly, and wherein the hook portion of the second assembly comprises a single hook having a shank, a bend and a point.

12. The fish lure of claim 9, wherein the hook portion of the second assembly comprises first and second hook members disposed in an opposing arrangement, wherein each one of the first and second hook members includes a shank, a bend and a point, and wherein the point of each one of the first and second hook members is disposed in an overlapping and generally parallel arrangement with the shank of the other one of the first and second hook members when the hook portion is in a closed configuration.

13. The fish lure of claim 12, wherein the hook portion of the second assembly further comprises a biasing member for normally biasing the hook portion in the closed configuration, wherein the hook portion of the second assembly is operable between the closed configuration and an open configuration in response to a fish strike on the hook portion.

14. The fish lure of claim 13, wherein the biasing member comprises at least one band of a resiliently deformable material disposed between the shank of the first hook member and the shank of the second hook member of the hook portion of the second assembly.

15. The fish lure of claim 14, wherein the at least one band of a resiliently deformable material is a pair of O-rings disposed between the shank of the first hook member and the shank of the second hook member of the hook portion of the second assembly.

16. The fish lure of claim 15, wherein each O-ring of the pair of O-rings is an x-profile O-ring having a convex outer surface that is sized to receive a respective one of the shank of the first hook member and the shank of the second hook member of the hook portion of the second assembly.

17. The fish lure of claim 14, wherein the at least one band of a resiliently deformable material is a single O-ring disposed between the shank of the first hook member and the shank of the second hook member of the hook portion of the second assembly.

18. The fish lure of claim 17, wherein the O-ring is a single, circular O-ring.

19. A fish lure component, comprising:
a hook portion having first and second hook members disposed in an opposing arrangement, the first and second hook members each having a first end that is pivotably coupled about a common pivot pin, and the first and second hook members each having a shank extending away from the common pivot pin into a bend and terminating at a point, and a bend direction of the first hook member is opposite a bend direction of the second hook member such that the point of each one of the first and second hook members is disposed in an overlapping and generally parallel arrangement with the shank of the other one of the first and second hook members when the hook portion is in a closed configuration;
a biasing member for normally biasing the hook portion in a closed configuration; and
a housing for retaining the common pivot pin, the housing having external surfaces that define rotation inducing surfaces of a vane structure and that are configured to rotate the housing about an axis thereof during movement of the housing through a body of water in a direction that is generally aligned with the axis;
wherein the housing communicates with the hook portion such that rotational motion of the housing is transferred to the hook portion, and
wherein the hook portion is operable between the closed configuration and an open configuration in response to a fish strike on the hook portion; and
wherein the biasing member comprises at least one band of a resiliently deformable material disposed between the shank of the first hook member and the shank of the second hook member.

20. The fishing lure component of claim 19, wherein in the open configuration the point of each one of the first and second hook members is disposed outwardly of the shank of the other one of the first and second hook members.

21. The fish lure component of claim 19, comprising an attachment structure for coupling the fish lure component to a frame, the frame having a first arm portion and a second arm portion forming a generally V-shape, the first arm portion extending to a first end of the frame and the second arm portion extending to a second end of the frame, and wherein during use the attachment structure is coupled to the first end of the frame.

22. The fish lure component of claim 21, wherein the attachment structure is a swivel.

23. The fish lure component of claim 19, wherein the at least one band of a resiliently deformable material is a pair of O-rings disposed between the shank of the first hook member and the shank of the second hook member.

24. The fish lure component of claim 23, wherein each O-ring of the pair of O-rings is an x-profile O-ring having a convex outer surface that is sized to receive a respective one of the shank of the first hook member and the shank of the second hook member.

25. The fish lure component of claim 19, wherein the at least one band of a resiliently deformable material is a single O-ring disposed between the shank of the first hook member and the shank of the second hook member.

26. The fish lure component of claim 25, wherein the O-ring is an x-profile O-ring having a convex outer surface that is sized to receive the shanks of the first hook member and of the second hook member.

\* \* \* \* \*